(12) United States Patent
Sato et al.

(10) Patent No.: US 11,003,026 B2
(45) Date of Patent: May 11, 2021

(54) STEREOSCOPIC IMAGE DISPLAY DEVICE AND WEARABLE DISPLAY DEVICE

(71) Applicant: FUJIFILM Corporation, Tokyo (JP)

(72) Inventors: Hiroshi Sato, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/728,439

(22) Filed: Dec. 27, 2019

(65) Prior Publication Data

US 2020/0142213 A1 May 7, 2020

Related U.S. Application Data

(63) Continuation of application No. PCT/JP2018/024861, filed on Jun. 29, 2018.

(30) Foreign Application Priority Data

Jun. 30, 2017 (JP) .............................. JP2017-129565

(51) Int. Cl.
*G02F 1/13363* (2006.01)
*G02F 1/1335* (2006.01)

(52) U.S. Cl.
CPC .... *G02F 1/13363* (2013.01); *G02F 1/133528* (2013.01); *G02F 1/133541* (2021.01)

(58) Field of Classification Search
CPC ...... G02B 30/00; G02B 30/25; G02B 5/3083; G02B 5/3025; G02F 2001/133541; G02F 1/13363; G02F 1/133528; G02F 1/133541
See application file for complete search history.

(56) References Cited

U.S. PATENT DOCUMENTS 6,094,242 A     7/2000  Yamanaka
2014/0247487 A1* 9/2014  Jeon .................. G02F 1/133634
                                                    359/489.07
(Continued)

FOREIGN PATENT DOCUMENTS

JP       8-327940 A    12/1996
JP     2004-198693 A    7/2004
(Continued)

OTHER PUBLICATIONS

Japanese Office Action dated Jul. 7, 2020 for corresponding Application No. 2019-527067 with an English translation.
(Continued)

*Primary Examiner* — Jia X Pan
(74) *Attorney, Agent, or Firm* — Birch, Stewart, Kolasch & Birch, LLP

(57) ABSTRACT

Provided are a thin stereoscopic image display device that can also deal with a requirement for flexibility and a wearable display device including this stereoscopic image display device. The stereoscopic image display device includes a display panel, an optical element, and a circularly polarizing plate, in which the optical element includes an optically-anisotropic layer that is formed of a liquid crystal compound, the optically-anisotropic layer has a liquid crystal alignment pattern in which a direction of an optical axis derived from the liquid crystal compound changes while continuously rotating along at least one in-plane direction of the optically-anisotropic layer, and circularly polarized light emitted from the display panel is caused to advance in a direction different from a direction in which the circularly polarized light component is incident.

19 Claims, 9 Drawing Sheets

(56) References Cited

U.S. PATENT DOCUMENTS

| | | | | |
|---|---|---|---|---|
| 2016/0011353 A1* | 1/2016 | Escuti | ................... | G02B 5/3083 |
| | | | | 359/15 |
| 2016/0195660 A1* | 7/2016 | Nakao | ................... | G02B 5/3083 |
| | | | | 359/489.07 |
| 2016/0275884 A1* | 9/2016 | Cho | ..................... | G09G 3/2022 |
| 2016/0377776 A1 | 12/2016 | Ichihashi | | |
| 2018/0157068 A1 | 6/2018 | Yanai et al. | | |
| 2018/0204375 A1* | 7/2018 | Baek | ..................... | G06F 3/0304 |

FOREIGN PATENT DOCUMENTS

| | | |
|---|---|---|
| JP | 2014-115604 A | 6/2014 |
| JP | 2016-173570 A | 9/2016 |
| JP | 2016-206512 A | 12/2016 |
| JP | 6080121 B2 | 2/2017 |
| WO | WO2015/141759 A1 | 9/2015 |
| WO | WO 2017/022592 A | 2/2017 |

OTHER PUBLICATIONS

International Preliminary Report on Patentability and Written Opinion of the International Searching Authority (forms PCT/IB/373, PCT/ISA/237 and PCT/IB/326), dated Jan. 9, 2020, for corresponding International Application No. PCT/JP2018/024861, with an English translation of the Written Opinion.

International Search Report (form PCT/ISA/210), dated Sep. 25, 2018, for corresponding International Application No. PCT/JP2018/024861, with an English translation.

* cited by examiner

STEREOSCOPIC IMAGE DISPLAY DEVICE AND WEARABLE DISPLAY DEVICE

CROSS-REFERENCE TO RELATED APPLICATIONS

This application is a Continuation of PCT International Application No. PCT/JP2018/024861 filed on Jun. 29, 2018, which claims priority under 35 U.S.C. § 119(a) to Japanese Patent Application No. 2017-129565 filed on Jun. 30, 2017. The above application is hereby expressly incorporated by reference, in its entirety, into the present application.

BACKGROUND OF THE INVENTION

1. Field of the Invention

The present invention relates to a stereoscopic image display device that displays a stereoscopic image and a wearable display device including the stereoscopic image display device.

2. Description of the Related Art

In a case where a stereoscopic image is displayed, for example, a target to be displayed is observed from different directions to generate a plurality of images, the respective images are divided, arranged, and displayed on a display panel, and the displayed images are observed through a lenticular lens, a lens array to display a stereoscopic image using a parallax.

As the stereoscopic image display device, for example, a binocular stereoscopic display device that generates a left-eye image and a right-eye image and makes an observer visually recognize stereoscopic vision using a parallax between the right and left eyes, a multi-view stereoscopic display device (super multi-view stereoscopic display device) in which three or more viewpoints are set, or a spatial image reproducing system (light field display or integral photography display) that forms an image in a space using light emitted from a display having a two-dimensional display surface to reproduce a stereoscopic image in the space is known.

For example, JP6080121B describes a stereoscopic image display device including: a display panel (display portion) having a two-dimensional display portion; a lens array in which a plurality of element lenses are two-dimensionally arranged on a surface that is spaced from the display surface by a predetermined distance and is substantially parallel to the display surface; and a display controller that displays images individually corresponding to the plurality of element lenses on the display panel at a smaller pitch than a lens pitch of the lens array.

SUMMARY OF THE INVENTION

As described in JP6080121B, in the stereoscopic image display device of the related art, the lenticular lens, the lens array, and the like are used. Therefore, even in a case where a thin display panel is used, there is a limit in reducing the thickness of the stereoscopic image display device.

In addition, the lenticular lens, the lens array, and the like have low flexibility. Therefore, even in a case where a display panel having flexibility is used, it is difficult to obtain a stereoscopic image display device having flexibility.

An object of the present invention is to solve the above-described problems of the related art and to provide: a stereoscopic image display device in which excellent flexibility can also be realized; and a wearable display device including the stereoscopic image display device.

The present invention achieves this object with the following configurations.

[1] A stereoscopic image display device comprising:
a display panel;
an optical element; and
a circularly polarizing plate,
in which the optical element includes an optically-anisotropic layer that is formed of a composition including a liquid crystal compound,
the optically-anisotropic layer has a liquid crystal alignment pattern in which a direction of an optical axis derived from the liquid crystal compound changes while continuously rotating along at least one in-plane direction of the optically-anisotropic layer, and
the optically-anisotropic layer causes a part of a circularly polarized light component incident into the optically-anisotropic layer among light components emitted through a plurality of pixels of the display panel to advance in a direction different from a direction in which the part of the circularly polarized light component is incident.

[2] A stereoscopic image display device comprising:
a display panel that emits circularly polarized light; and
an optical element,
in which the optical element includes an optically-anisotropic layer that is formed of a composition including a liquid crystal compound,
the optically-anisotropic layer has a liquid crystal alignment pattern in which a direction of an optical axis derived from the liquid crystal compound changes while continuously rotating along at least one in-plane direction of the optically-anisotropic layer, and
the optically-anisotropic layer causes a part of a circularly polarized light component incident into the optically-anisotropic layer among light components emitted through a plurality of pixels of the display panel to advance in a direction different from a direction in which the part of the circularly polarized light component is incident.

[3] The stereoscopic image display device according to [1] or [2],
in which the liquid crystal alignment pattern is a concentric circular alignment pattern in which the direction of the optical axis changes while continuously rotating along one direction in a concentric circular shape from an inside to an outside of the liquid crystal alignment pattern, and
in the optically-anisotropic layer, small regions having the concentric circular alignment pattern are two-dimensionally arranged.

[4] The stereoscopic image display device according to [3],
in which in the concentric circular liquid crystal alignment pattern, a distance in which the optical axis rotates by 180° changes from an inside to an outside of the concentric circular liquid crystal alignment pattern.

[5] The stereoscopic image display device according to [3] or [4],
in which the display panel displays a plurality of different images corresponding to one small region.

[6] The stereoscopic image display device according to [1] or [2],
wherein the liquid crystal alignment pattern has a first alignment pattern and a second alignment pattern in which directions of optical axes continuously change along one direction and rotation directions of the optical axes are opposite to each other, and in the optically-anisotropic layer, a first region and a second region are alternately arranged in the direction in which the direction of the optical axis of the liquid crystal alignment pattern changes, the first region having the first alignment pattern and being elongated in a direction perpendicular to the direction in which the direction of the optical axis of the liquid crystal alignment pattern changes, and the second region having the second alignment pattern and being elongated in the direction perpendicular to the direction in which the direction of the optical axis of the liquid crystal alignment pattern changes.

[7] The stereoscopic image display device according to [6], wherein in each of the first region and the second region of the liquid crystal alignment pattern, a distance in which the optical axis rotates by 180° changes from one end to another end of the region in the direction in which the direction of the optical axis of the liquid crystal alignment pattern changes.

[8] The stereoscopic image display device according to [6] or [7], in which the display panel displays a plurality of different images corresponding to a combination of one first region and one second region.

[9] The stereoscopic image display device according to [1] or [2], in which in the liquid crystal alignment pattern, the direction of the optical axis continuously changes along one direction, the circularly polarizing plate is a combination of a linear polarizer and an λ/4 plate, the λ/4 plate has a first phase difference region and a second phase difference region that are divided in the direction in which the direction of the optical axis of the liquid crystal alignment pattern changes and that are elongated in a direction perpendicular to the direction in which the direction of the optical axis of the liquid crystal alignment pattern changes, and directions of slow axes in the first phase difference region and the second phase difference region are perpendicular to each other.

[10] The stereoscopic image display device according to [9], in which in the liquid crystal alignment pattern, a distance in which the optical axis rotates by 180° changes in the direction in which the direction of the optical axis of the liquid crystal alignment pattern changes.

[11] The stereoscopic image display device according to [9] or [1]0, wherein the display panel displays a plurality of different images corresponding to a combination of one first phase difference region and one second phase difference region.

[12] The stereoscopic image display device according to any one of [1] to [11], in which in a case where refractive index anisotropy of the liquid crystal compound at a wavelength of 550 nm is represented by $\Delta n_{550}$ and a thickness of the optically-anisotropic layer is represented by d, the following Expression (1) is satisfied, $$200 \text{ nm} \leq \Delta n_{550} \times d \leq 350 \text{ nm} \quad (1).$$

[13] The stereoscopic image display device according to any one of [1] to [12], wherein in a case where refractive index anisotropy of the liquid crystal compound at a wavelength of 450 nm is represented by $\Delta n_{450}$, refractive index anisotropy of the liquid crystal compound at a wavelength of 550 nm is represented by $\Delta n_{550}$, and a thickness of the optically-anisotropic layer is represented by d, the following Expression (2) is satisfied, $$(\Delta n_{450} \times d)/(\Delta n_{550} \times d) < 1 \quad (2).$$

[14] The stereoscopic image display device according to any one of [1] to [13], in which the circularly polarizing plate is a combination of a linear polarizer and an λ/4 plate in which an in-plane retardation Re(550) at a wavelength of 550 nm satisfies the following expression, $$100 \text{ nm} \leq Re(550) \leq 180 \text{ nm}.$$

[15] The stereoscopic image display device according to [14], wherein in the λ/4 plate, an in-plane retardation Re(450) at a wavelength of 450 nm and an in-plane retardation Re(550) at a wavelength of 550 nm satisfy the following expression, $$Re(450)/Re(550) < 1.$$

[16] A wearable display device comprising:

the stereoscopic image display device according to any one of claims 1 to 15; and an eyepiece for collecting an image displayed by the stereoscopic image display device.

According to the present invention, it is possible to provide: a thin stereoscopic image display device in which excellent flexibility can also be realized; and a wearable display device including the stereoscopic image display device.

DESCRIPTION OF THE PREFERRED EMBODIMENTS

Hereinafter, a stereoscopic image display device and a wearable display device according to the embodiment of the present invention will be described in detail based on a preferable embodiment illustrated in the accompanying drawings.

In each of the drawings, for easy visual recognition, the reduced scale of components is different from the actual scale.

Embodiment 1

Figure 1:
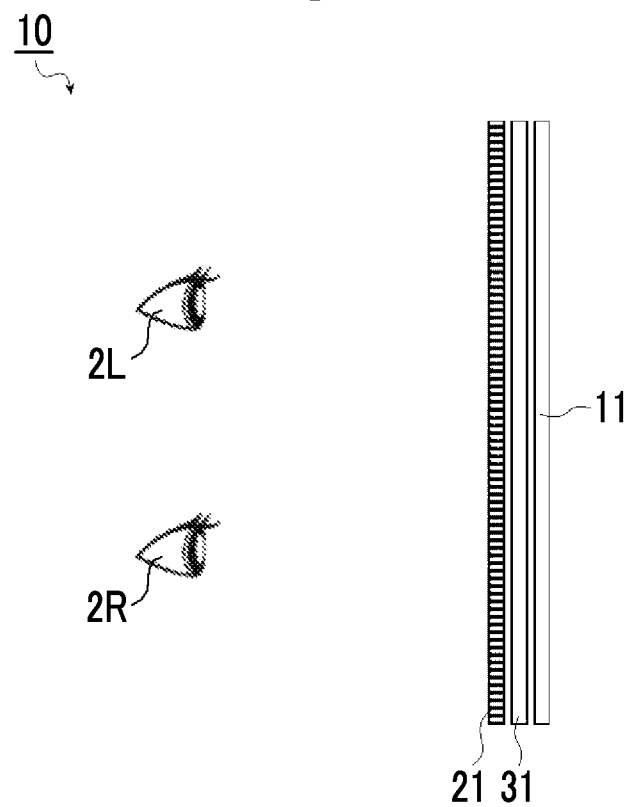
FIG. 1 is a diagram illustrating a schematic configuration of a stereoscopic image display device according to Embodiment 1 of the present invention.

FIG. 1 is a diagram illustrating a schematic configuration of a stereoscopic image display device 10 according to Embodiment 1 of the present invention. The stereoscopic image display device 10 includes: a display panel 11 for displaying an image; an optical element 21; and a circularly polarizing plate 31 that is provided between the display panel 11 and the optical element 21.

Figure 2:
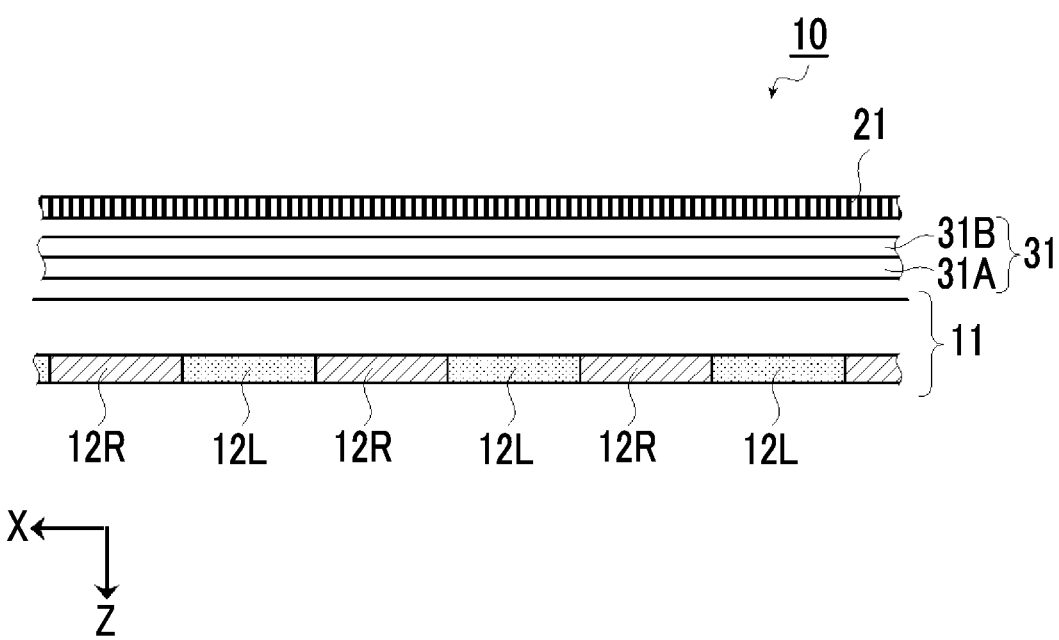
FIG. 2 is a partial side cross-sectional view illustrating a display panel, a circularly polarizing plate, and an optical element according to Embodiment 1 of the present invention.

FIG. 2 is a side cross-sectional view illustrating the display panel 11, the optical element 21, and the circularly polarizing plate 31.

The display panel 11 is a well-known display panel that displays a video image or a static image and is used for, for example, a liquid crystal display, an organic electroluminescence display, or a light emitting diode display (a LED display or a micro LED display).

In the example illustrated in the drawing, the display panel 11 displays an image in which an image 12R corresponding to observation with a right eye 2R, an image 12L corresponding to observation with a left eye 2L are alternately arranged in a direction in which a direction of an optical axis 24A of a rod-shaped liquid crystal compound 24 described below changes. The direction in which the direction of the optical axis 24A of the rod-shaped liquid crystal compound 24 is a direction of an arrangement axis A described below and is a direction indicated by X in the drawing.

The display panel 11 emits the displayed image (light) to the circularly polarizing plate 31 and the optical element 21.

Here, for convenience of description, a direction from the optical element 21 toward the display panel 11 will be referred to as a direction indicated by Z in the drawing, a plane perpendicular to the arrow Z direction will be referred to as "XY plane", and it is assumed that the display panel 11 and the optical element 21 are disposed parallel to the XY plane. FIG. 2 illustrates a state where the image 12R and the image 12L displayed on the display panel 11 are alternately displayed in the arrow X direction.

Figure 3:
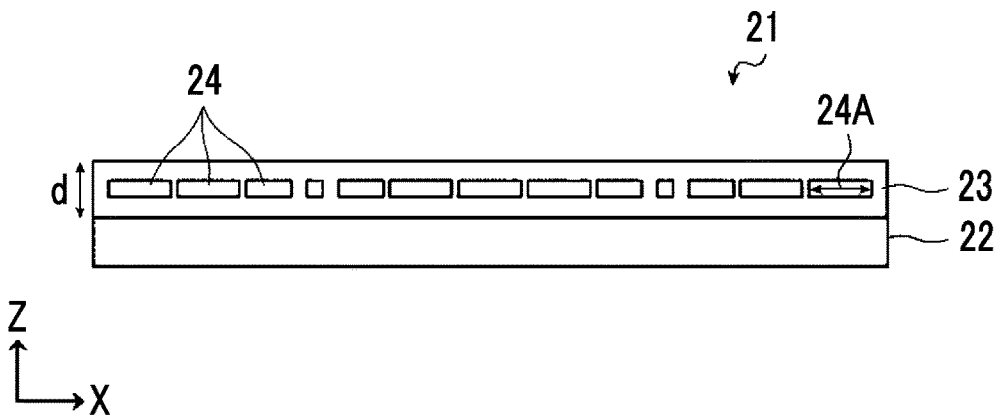
FIG. 3 is a partial side cross-sectional view illustrating the optical element according to Embodiment 1 of the present invention.

FIG. 3 is a side cross-sectional view illustrating the optical element 21. As illustrated in FIG. 3, the optical element 21 includes a transparent support 22 such as a plastic film and an optically-anisotropic layer 23 having a thickness d. The optically-anisotropic layer 23 has a function of a general $\lambda/2$ plate, that is, a function of imparting a phase difference of a half wavelength, that is, 180° to two linearly polarized light components that are included in light incident into the optically-anisotropic layer 23 and are perpendicular to each other. In addition, the optically-anisotropic layer 23 is formed using a composition including a plurality of rod-shaped liquid crystal compounds 24 as liquid crystal compounds. Each of the plurality of rod-shaped liquid crystal compounds 24 is arranged in an XY plane parallel to the optically-anisotropic layer 23.

In addition, the optically-anisotropic layer 23 has the optical axis 24A derived from the rod-shaped liquid crystal compound 24. This optical axis 24A is aligned along a rod-shaped major axis direction of the rod-shaped liquid crystal compound 24 and is an axis having the highest refractive index in the rod-shaped liquid crystal compound 24, that is, a so-called slow axis. In the following description, "the optical axis 24A derived from the rod-shaped liquid crystal compound 24" will also be referred to as "the optical axis 24A of the rod-shaped liquid crystal compound".

In addition, the optical element 21 may be configured with the optically-anisotropic layer 23 without a transparent support. For example, after forming the optically-anisotropic layer 23 on the transparent support 22, the transparent support 22 may be released for use.

Figure 4:
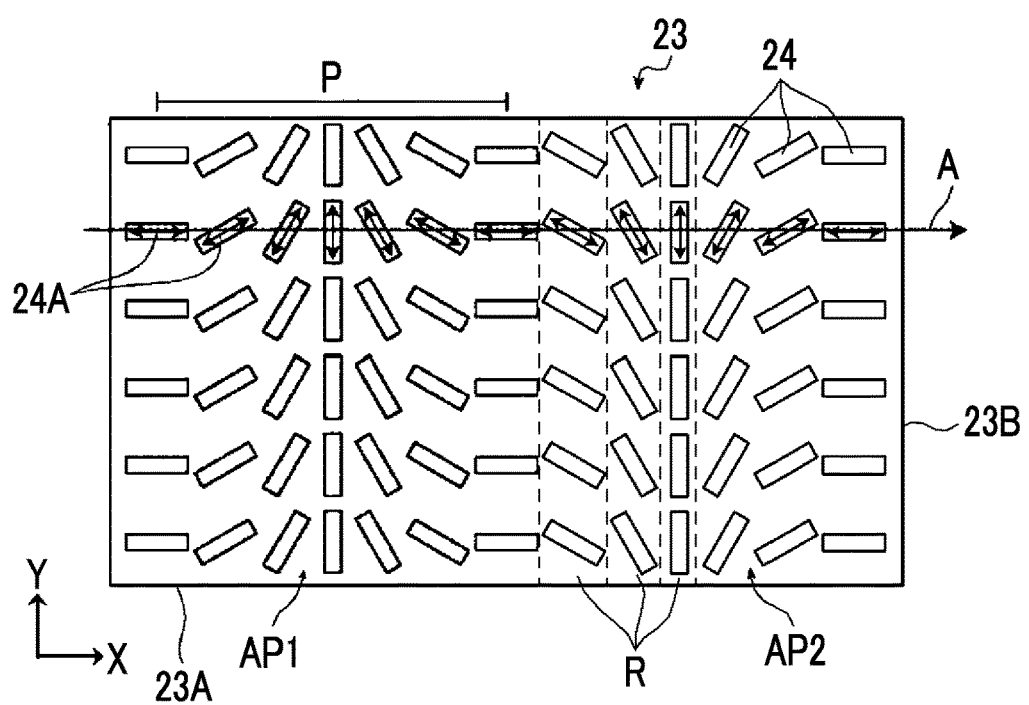
FIG. 4 is a partial plan view illustrating the optical element according to Embodiment 1 of the present invention.

FIG. 4 is a partial plan view illustrating the optical element 21. As illustrated in FIG. 4, the plurality of rod-shaped liquid crystal compounds 24 of the optically-anisotropic layer 23 are arranged along a plurality of arrangement axes parallel to each other in the XY plane. On each of the arrangement axes A, a direction of each of the optical axes 24A of the plurality of rod-shaped liquid crystal compounds 24 changes while continuously rotating in one direction along the arrangement axis A. Here, for convenience of description, it is assumed that the arrangement axis is aligned in the arrow X direction. In addition, in a direction indicated by arrow Y in the drawing perpendicular to the arrow X direction, the plurality of rod-shaped liquid crystal compounds 24 in which the directions of the optical axes 24A are the same are arranged at regular intervals.

In addition, the direction of the optical axis 24A of the rod-shaped liquid crystal compound 24 changing while continuously rotating along the arrangement axis A represents that an angle between each of the optical axes 24A of the plurality of rod-shaped liquid crystal compounds 24 arranged along the arrangement axes A and the arrangement axis A varies depending on positions in the arrangement axis A direction and gradually changes from $\theta$ to $\theta+180°$ or $\theta-180°$.

At this time, as illustrated in FIG. 4, the optical axes 24A of the plurality of rod-shaped liquid crystal compounds 24 can change while rotating by a predetermined angle along the arrangement axes A. A difference between the angles of the optical axes 24A of the rod-shaped liquid crystal compound 24 adjacent to each other along the arrangement axes A is preferably 45° or less and more preferably less than 45°.

In addition, a liquid crystal alignment pattern AP1 (first alignment pattern) is formed in the optically-anisotropic layer 23 by the directions of the optical axes 24A of the plurality of rod-shaped liquid crystal compounds 24 changing while continuously rotating counterclockwise along the arrangement axes A.

Likewise, a liquid crystal alignment pattern AP2 (second alignment pattern) is formed in the optically-anisotropic layer 23 by the directions of the optical axes 24A of the plurality of rod-shaped liquid crystal compounds 24 changing while continuously rotating clockwise along the arrangement axes A.

That is, the optically-anisotropic layer 23 has the two liquid crystal alignment patterns in which the rotation directions of the rod-shaped liquid crystal compounds 24 are opposite to each other.

The liquid crystal alignment patterns AP1 and AP2 are patterns that are repeated along the arrangement axis A, and pitches P thereof are defined by the distance in which the angle between the optical axis 24A of the rod-shaped liquid crystal compound 24 and the arrangement axis A changes from θ to θ+180° (180° rotation pitch). The length of the pitch P is preferably 45 μm or less, more preferably 30 μm or less, and still more preferably 15 μm or less.

In addition, as illustrated in FIG. 4, in the optically-anisotropic layer 23, the rod-shaped liquid crystal compounds 24 having the plurality of optical axes 24A directed in the same direction are arranged in the arrow Y direction.

An elongated region in which the rod-shaped liquid crystal compounds 24 having the plurality of optical axes 24A directed in the same direction are arranged in the arrow Y direction will be referred to as "region R". In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness d of the optically-anisotropic layer 23. Here, the difference in refractive index generated by refractive index anisotropy of the region R in the optically-anisotropic layer 23 is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the rod-shaped liquid crystal compound 24 in the direction of the optical axis 24A and a refractive index of the rod-shaped liquid crystal compound 24 in a direction perpendicular to the optical axis 24A in a plane of the region R.

Figure 5:
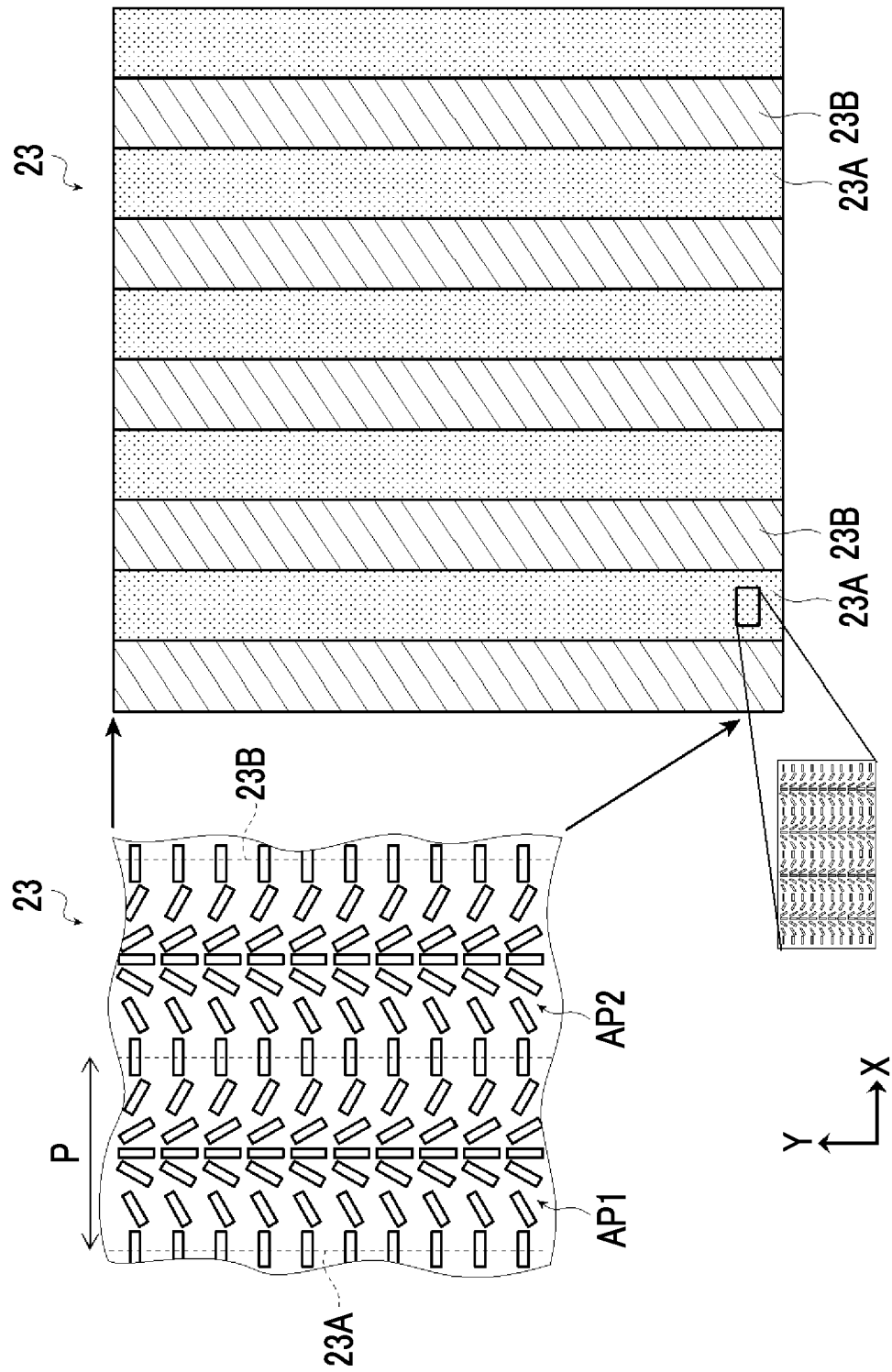
FIG. 5 is a plan view illustrating an optically-anisotropic layer according to Embodiment 1 of the present invention.

As illustrated in FIG. 5, in the optically-anisotropic layer 23, a first region 23A having the liquid crystal alignment pattern AP1 and a second region 23B having the liquid crystal alignment pattern AP2 are alternately arranged in the direction of the arrangement axis A, that is, in the direction (the arrow X direction in the drawing) in which the optical axis 24A of the rod-shaped liquid crystal compound 24 changes.

As illustrated in FIG. 5, the first region 23A and the second region 23B are elongated in a direction perpendicular to the direction of the arrangement axis A, that is, in the same direction (the arrow Y direction in the drawing) as a longitudinal direction of the above-described elongated region R.

On the left side of FIGS. 4 and 5, only one pitch of the liquid crystal alignment pattern AP1 and the liquid crystal alignment pattern AP2 are illustrated to be adjacent to each other. However, actually, as illustrated in an enlarged view of the right side of FIG. 5, a plurality of pitches of the liquid crystal alignment patterns AP1 and the liquid crystal alignment patterns AP2 are continuously formed. Accordingly, the first region 23A is formed by repeating a predetermined number of pitches of the liquid crystal alignment patterns AP1, and the second region 23B is formed by repeating the same number of pitches of the liquid crystal alignment patterns AP2.

Next, in a case where light is incident into the optically-anisotropic layer 23 of the optical element 21 according to Embodiment 1, the behavior of transmitted light will be described.

Figure 6:
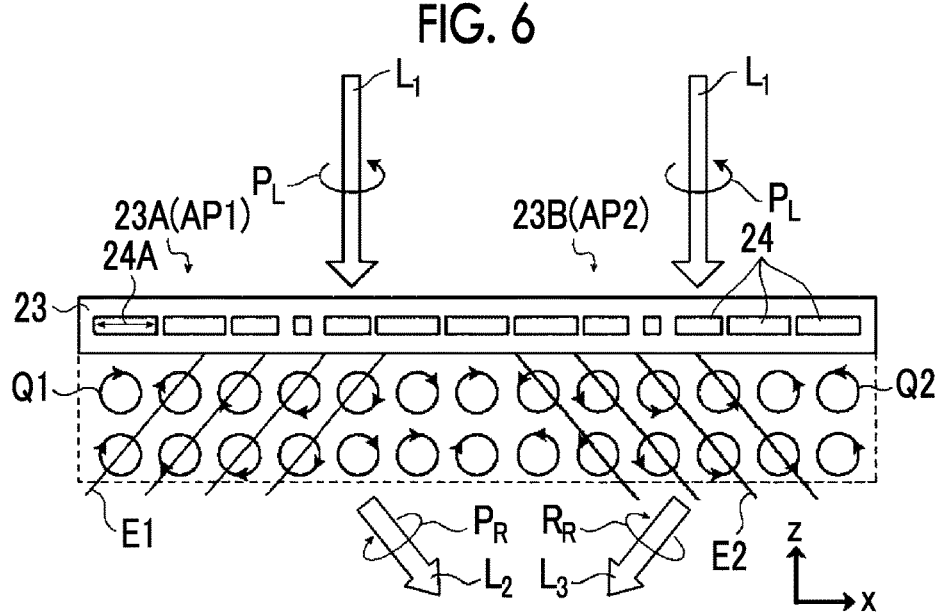
FIG. 6 is a diagram illustrating the behavior of transmitted light in a case where left circularly polarized light is incident into the optical element according to Embodiment 1 of the present invention.

As illustrated in FIG. 6, in a case where incidence light $L_1$ of left circularly polarized light $P_L$ is incident into the first region 23A in the optically-anisotropic layer 23 of the optical element 21, that is, the region having the liquid crystal alignment pattern AP1, the incidence light $L_1$ transmits through the optically-anisotropic layer 23 to be imparted with a phase difference of 180° and is converted into transmitted light $L_2$ of right circularly polarized light $P_R$.

In addition, in a case where the incidence light $L_1$ transmits through the optically-anisotropic layer 23, an absolute phase thereof changes depending on the direction of the optical axis 24A derived from each of the rod-shaped liquid crystal compounds 24. At this time, the optical axis 24A changes along the arrangement axis A while rotating counterclockwise. Therefore, a variation in the absolute phase of the incidence light $L_1$ varies depending on the direction of the optical axis 24A.

Further, the liquid crystal alignment pattern AP1 that is formed in the optically-anisotropic layer 23 is a pattern that is periodic in the arrow X direction. Therefore, as illustrated in FIG. 6, the incidence light $L_1$ transmitted through the optically-anisotropic layer 23 is imparted with an absolute phase Q1 that is periodic in the arrow X direction corresponding to the direction of each of the optical axes 24A. As a result, an equiphase surface E1 that is inclined in the arrow Z direction with respect to the XY plane is formed. Therefore, the incidence light $L_1$ is bent to be inclined in a direction perpendicular to the equiphase surface E1 and advances in a direction different from an advancing direction of the incidence light $L_1$. This way, the incidence light $L_1$ of the left circularly polarized light $P_L$ is converted into the transmitted light $L_2$ of the right circularly polarized light $P_R$ that is inclined by a predetermined angle with respect to the arrow Z direction.

On the other hand, in a case where the incidence light $L_1$ of the left circularly polarized light $P_L$ is incident into the second region 23B in the optically-anisotropic layer 23 of the optical element 21, that is, the region having the liquid crystal alignment pattern AP2, similarly, the incidence light $L_1$ transmits through the optically-anisotropic layer 23 to be imparted with a phase difference of 180° and is converted into the transmitted light $L_2$ of the right circularly polarized light $P_R$.

In addition, similarly, in a case where the incidence light $L_1$ transmits through the optically-anisotropic layer 23, an absolute phase thereof changes depending on the direction of the optical axis 24A derived from each of the rod-shaped liquid crystal compounds 24. The optical axis 24A changes along the arrangement axis A while rotating clockwise. Therefore, a variation in the absolute phase of the incidence light $L_1$ varies depending on the direction of the optical axis 24A. Further, the liquid crystal alignment pattern AP2 that is formed in the optically-anisotropic layer 23 is a pattern that is periodic in the arrow X direction. Therefore, as illustrated in FIG. 6, the incidence light $L_1$ transmitted through the optically-anisotropic layer 23 is imparted with an absolute phase Q2 that is periodic in the arrow X direction corresponding to the direction of each of the optical axes 24A.

Here, in the liquid crystal alignment pattern AP2, the optical axis 24A changes along the arrangement axis A while rotating clockwise that is opposite to the rotation direction of the above-described liquid crystal alignment pattern AP1. Therefore, the absolute phase Q2 that is periodic in the arrow X direction corresponding to the direction of the optical axis 24A is opposite to that of the liquid crystal alignment pattern AP1. As a result, in the second region 23B, that is, the region having the liquid crystal alignment pattern AP2, an equiphase surface E2 that is inclined in a direction opposite to that of the first region 23A, that is, the region having the liquid crystal alignment pattern AP1 is formed.

Therefore, the incidence light $L_1$ of the left circularly polarized light $P_L$ incident into the second region 23B (the liquid crystal alignment pattern AP2) is converted into transmitted light $L_3$ of right circularly polarized light $P_R$ that is inclined by a predetermined angle with respect to the arrow Z direction and advances toward the transmitted light $L_2$ of the right circularly polarized light $P_R$ incident into the first region 23A.

Figure 7:
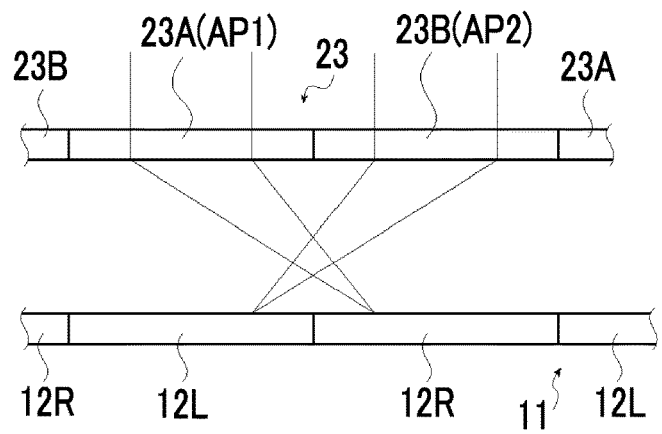
FIG. 7 is a diagram illustrating the behavior of transmitted light in a case where left circularly polarized light is incident into the optical element according to Embodiment 1 of the present invention.

Accordingly, in the stereoscopic image display device 10, by causing the image displayed by the display panel 11 to be incident into the optical element 21 as predetermined circularly polarized light (in the example illustrated in the drawing, left circularly polarized light), as in the stereoscopic image display device including the lenticular lens, the lens array, and the like, light is bent and dividedly collected into the right side and the left side by the first region 23A and the second region 23B as illustrated in FIG. 7, the image 12R corresponding to observation with the right eye 2R is incident into the right eye 2R of the observer, and the image 12L corresponding to observation with the left eye 2L is incident into the left eye 2L of the observer. As a result, an excellent stereoscopic image can be displayed.

In addition, as described below, the optically-anisotropic layer 23 of the optical element 21 is formed of a composition including a liquid crystal compound. Therefore, as compared to the lenticular lens, the lens array, and the like, the thickness can be significantly reduced, that is, a thin stereoscopic image display device can be realized, and the present invention is suitably applicable to a stereoscopic image display device having flexibility.

By changing the pitches P of the liquid crystal alignment patterns AP1 and AP2 formed in the optically-anisotropic layer 23, the inclination of the transmitted light $L_2$ and the transmitted light $L_3$ with respect to the arrow Z direction can be changed. More specifically, as the pitches P of the liquid crystal alignment patterns AP1 and AP2 decrease, light components transmitted through the rod-shaped liquid crystal compounds 24 adjacent to each other more strongly interfere with each other. Therefore, the transmitted light $L_2$ can be more largely bent. In addition, by changing the pitches P of the liquid crystal alignment patterns AP1 and AP2 in a plane of the optically-anisotropic layer, an angle by which the transmitted light is bent in a plane can be changed.

Accordingly, by adjusting the phase difference of the optically-anisotropic layer 23 and the pitches P of the liquid crystal alignment patterns AP1 and AP2, the influence of secondary diffracted light is reduced, a direction of the light is controlled, and a stereoscopic image display device having excellent stereoscopic visibility can be realized. It is also preferable that, in each of the first region 23A and the second region 23B of the liquid crystal alignment patterns AP1 and AP2, a distance in which the optical axis 24A rotates by 180° changes from one end to another end of the region in the direction in which the direction of the optical axis of each of the liquid crystal alignment patterns AP1 and AP2 changes.

The above-described point is also applicable to Embodiment 2 and Embodiment 3 described below.

In the above-described example, as illustrated in FIGS. 2 and 7, the display panel 11 displays two images corresponding to a pair of the first region 23A and the second region 23B, the images including the image 12R corresponding to observation with the right eye 2R and the image 12L corresponding to observation with the left eye 2L. However, the present invention is not limited to this example.

That is, in the stereoscopic image display device 10, the pair of the first region 23A and the second region 23B may correspond to the number of images displayed on the display panel 11 to display a stereoscopic image. Accordingly, the display panel 11 may display three or more different images corresponding to the pair of the first region 23A and the second region 23B. It is more preferable that three or more parallax images are displayed from the viewpoint that a stereoscopic image corresponding to motion parallax can be displayed.

Further, it is still more preferable that the number of parallax images is increased from the viewpoint that a high-quality stereoscopic image such as so-called light field (integral photography) can be displayed.

In the optically-anisotropic layer 23 of the optical element 21, the in-plane retardation value of the plurality of regions R is a half wavelength. However, as long as an in-plane retardation $Re(550)=\Delta n_{550} \times d$ of the plurality of regions R of the optically-anisotropic layer 23 with respect to the incidence light having a wavelength of 550 nm is in a range defined by the following Expression (1), the effects of the stereoscopic image display device 10 according to Embodiment 1 can be sufficiently obtained. Here, $\Delta n_{550}$ represents a difference in refractive index generated by refractive index anisotropy of the region R in a case where the wavelength of incidence light is 550 nm, and d represents the thickness of the optically-anisotropic layer 23.

$$200 \text{ nm} \leq \Delta n_{550} \times d \leq 350 \text{ nm} \quad (1).$$

That is, the in-plane retardation $Re(550)=\Delta n_{550} \times d$ of the plurality of regions R of the optically-anisotropic layer 23 satisfies Expression (1), a sufficient amount of a circularly polarized light component in light incident into the optically-anisotropic layer 23 can be converted into circularly polarized light that advances in a direction inclined with the arrow Z direction. Therefore, in the stereoscopic image display device 10, a stereoscopic image can be suitably displayed. It is more preferable that the in-plane retardation $Re(550)=\Delta n_{550} \times d$ satisfies $225 \text{ nm} \leq \Delta n_{550} \times d \leq 340 \text{ nm}$, and it is still more preferable that the in-plane retardation $Re(550)=\Delta n_{550} \times d$ satisfies $250 \text{ nm} \leq \Delta n_{550} \times d \leq 330 \text{ nm}$.

Further, it is preferable that an in-plane retardation $Re(450)=\Delta n_{450} \times d$ of each of the plurality of regions R of the optically-anisotropic layer 23 with respect to incidence light having a wavelength of 450 nm and an in-plane retardation $Re(550)=\Delta n_{550} \times d$ of each of the plurality of regions R of the optically-anisotropic layer 23 with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \qquad (2).$$

Expression (2) represents that the rod-shaped liquid crystal compound 24 included in the optically-anisotropic layer 23 has reverse dispersibility. That is, by satisfying Expression (2), the optically-anisotropic layer 23 can correspond to incidence light having a wide range of wavelength.

The circularly polarizing plate 31 is provided between the optical element 21 and the display panel 11.

As illustrated in FIG. 2, the circularly polarizing plate 31 includes a polarizer 31A on the display panel 11 side and an λ/4 plate 31B on the optical element 21 side. In a case where the display panel 11 includes the polarizer, that is, emits only predetermined linearly polarized light, the circularly polarizing plate 31 may be configured by providing only the λ/4 plate 31B.

In the stereoscopic image display device 10, among light components with which the display panel 11 is irradiated, only predetermined linearly polarized light is caused to transmit through the polarizer 31A, and this linearly polarized light is caused to transmit through the λ/4 plate 31B such that left circularly polarized light is incident into the optical element 21.

In addition, although not illustrated in the drawing, a cholesteric liquid crystal layer may be used as the circularly polarizing plate 31 instead of the circularly polarizing plate 31 including the polarizer 31A and the λ/4 plate 31B.

Further, a display that emits circularly polarized light may be used without using the circularly polarizing plate 31. For example, an organic electroluminescence display that emits circularly polarized light can be used. A display that emits linearly polarized light may be combined with an λ/4 plate, and examples thereof include an aspect described in JP2004-030955A. In addition, an organic electroluminescence (EL) display panel including a circularly polarized light region that corresponds to a light emitting portion emitting light components having different wavelengths and corresponds to emission wavelengths may be used.

As the polarizer 31A, all the well-known polarizers can be used, and various general linear polarizing plates such as an absorption polarizing plate including an iodine compound or a reflective polarizing plate including a wire grid can be used.

As the λ/4 plate 31B, various well-known λ/4 plates such as an λ/4 plate formed of a liquid crystal compound or an λ/4 plate formed of a polymer film can be used as long as an in-plane retardation Re(550) at a wavelength of 550 nm satisfies "100 nm≤Re(550)≤180 nm".

It is more preferable that the in-plane retardation of the λ/4 plate 31B satisfies 110 nm≤Re(550)≤170 nm, and it is still more preferable that the in-plane retardation of the λ/4 plate 31B satisfies 120 nm≤Re(550)≤160 nm.

In addition, in the λ/4 plate 31B, an in-plane retardation Re(450) at a wavelength of 450 nm and an in-plane retardation Re(550) at a wavelength of 550 nm satisfy "Re(450)/Re(550)<1". That is, it is preferable that the λ/4 plate 31B is a λ/4 plate having reverse dispersibility.

In the stereoscopic image display device 10, the circularly polarizing plate 31 is disposed between the optical element 21 and the display panel 11, but the present invention is not limited thereto. The circularly polarizing plate 31 only has to be disposed between the observer and the display panel 11.

Specifically, the circularly polarizing plate 31 may be disposed opposite to the display panel 11 of the optical element 21.

That is, in the stereoscopic image display device according to the embodiment of the present invention, all the light components are caused to be incident into the optical element 21 such that light transmitted through the circularly polarizing plate 31 is observed by the observer.

Embodiment 2

As in the stereoscopic image display device 10 according to Embodiment 1, a stereoscopic image display device according to Embodiment 2 of the present invention includes an optical element, a circularly polarizing plate, and a display panel. In addition, in the stereoscopic image display device according to Embodiment 2, the optical element includes a support and an optically-anisotropic layer, and the circularly polarizing plate includes a polarizer and an λ/4 plate. Further, as in Embodiment 1, as the circularly polarizing plate 31, a cholesteric layer may be used or a display that emits circularly polarized light may be used.

Basically, the stereoscopic image display device according to Embodiment 2 has the same configuration as the stereoscopic image display device 10 according to Embodiment 1, except that the optically-anisotropic layer of the optical element and the λ/4 plate of the circularly polarizing plate are different from those of Embodiment 1.

Figure 8:
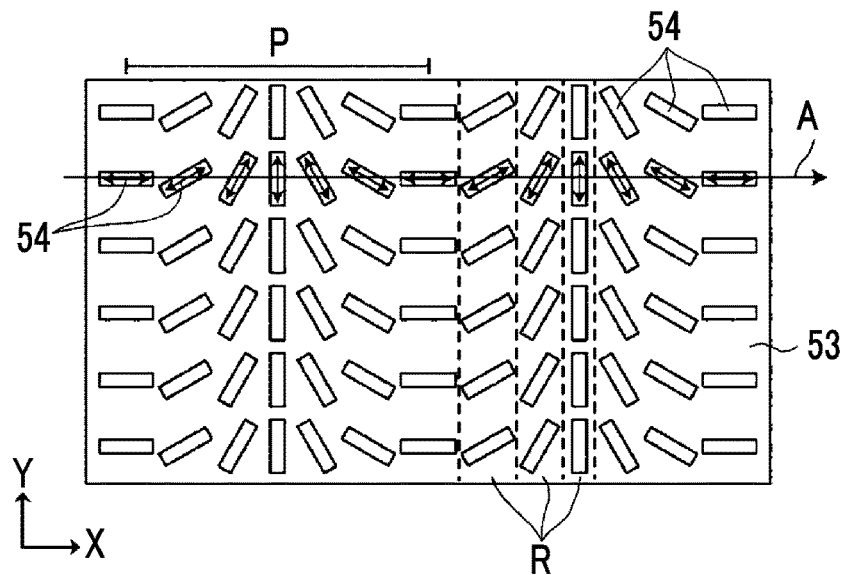
FIG. 8 is a partial plan view illustrating an optical element according to Embodiment 2 of the present invention.

FIG. 8 is a partial plan view illustrating an optically-anisotropic layer 53 of the optical element according to Embodiment 2.

As illustrated in FIG. 4, the optically-anisotropic layer 23 includes the first region 23A having the liquid crystal alignment pattern AP1 and the second region 23B having the liquid crystal alignment pattern AP2, in which the rotation directions of the optical axes 24A of the rod-shaped liquid crystal compounds 24 are opposite to each other.

On the other hand, in Embodiment 2 of the present invention, in the optically-anisotropic layer 53, the rotation direction of the optical axes 54A of the rod-shaped liquid crystal compounds 54 is one direction as illustrated in FIG. 8. In the example illustrated in the drawing, the rotation direction of the optical axes 54A of the rod-shaped liquid crystal compounds are only counterclockwise direction that is the same as that of the liquid crystal alignment pattern AP1.

Figure 9:
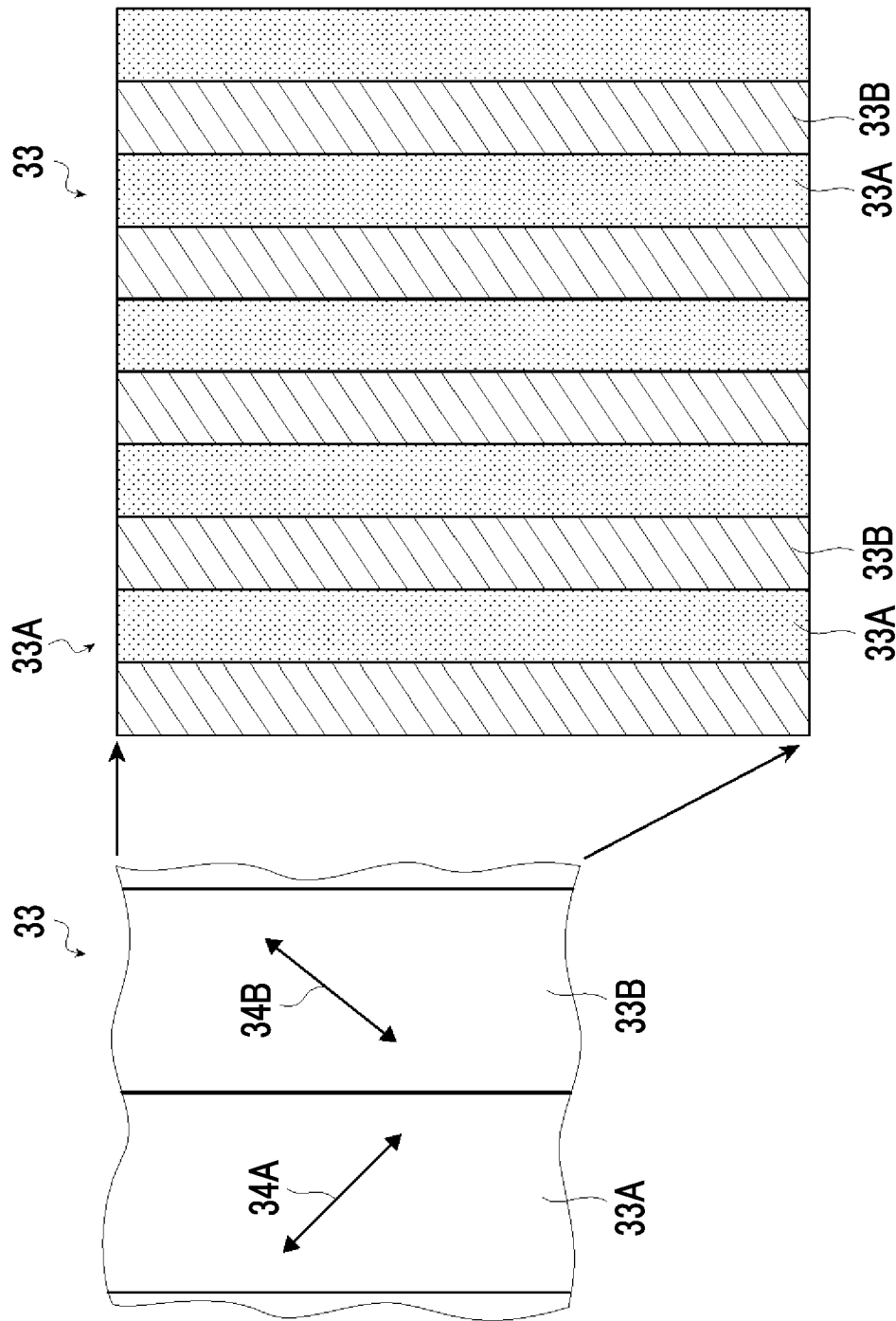
FIG. 9 is a plan view illustrating an optically-anisotropic layer according to Embodiment 2 of the present invention.

FIG. 9 is a plan view illustrating an λ/4 plate 33 of the circularly polarizing plate of the optical element according to Embodiment 2.

As illustrated in FIG. 9, the λ/4 plate 33 is divided into a plurality of regions in the direction of the arrangement axis A, that is, the direction in which the optical axis 54A of the rod-shaped liquid crystal compound 54 changes, and directions of slow axes in regions adjacent to each other are perpendicular to each other. The direction of the arrangement axis A is the arrow X direction in the drawing.

That is, the λ/4 plate 33 includes a first phase difference region 33A and a second phase difference region 33B that are divided in the direction (arrangement axis direction=arrow X direction) in which the optical axis 54A of the rod-shaped liquid crystal compound 54 changes and that are elongated in the arrow Y direction. In addition, as illustrated in an enlarged view of the left side of FIG. 9 illustrating a part of the λ/4 plate 33, the first phase difference region 33A and the second phase difference region 33B are λ/4 plates, but a slow axis 34A of the first phase difference region 33A and a slow axis 34B of the second phase difference region 33B are perpendicular to each other.

The widths of the first phase difference region 33A and the second phase difference region 33B are the widths corresponding to repetition of the same number of pitches of liquid crystal alignment patterns. That is, the widths of the first phase difference region 33A and the second phase difference region 33B are the sizes of the first phase difference region 33A and the second phase difference region 33B in the arrow X direction.

In addition, in the stereoscopic image display device 10 according to Embodiment 1, the pair of the first region 23A and the second region 23B correspond to the number of images displayed on the display panel 11 to display a stereoscopic image. On the other hand, in the stereoscopic image display device according to Embodiment 2, a pair of the first phase difference region 33A and the second phase difference region 33B correspond to the number of images displayed on the display panel 11.

The behavior of light in the stereoscopic image display device according to Embodiment 2 will be described.

In the λ/4 plate 33 of the circularly polarizing plate of this stereoscopic image display device, light transmitted through the first phase difference region 33A is converted into, for example, left circularly polarized light, and light transmitted through the second phase difference region 33B is converted into, for example, right circularly polarized light.

Figure 10:
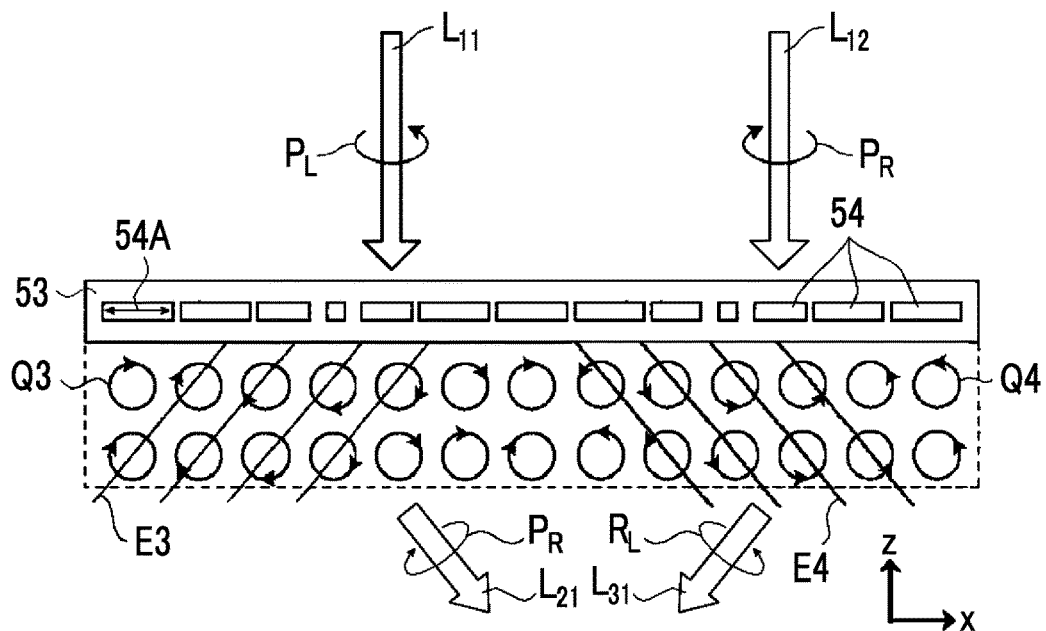
FIG. 10 is a diagram illustrating the behavior of transmitted light in a case where circularly polarized light is incident into the optical element according to Embodiment 2 of the present invention.

As illustrated in FIG. 10, in a case where incidence light $L_{11}$ of left circularly polarized light $P_L$ is incident into the optically-anisotropic layer 53 of the optical element, as described above, the incidence light $L_1$ transmits through the optically-anisotropic layer 53 to be imparted with a phase difference of 180° and is converted into transmitted light $L_{21}$ of right circularly polarized light $P_R$.

In addition, in a case where the incidence light $L_{11}$ transmits through the optically-anisotropic layer 53, an absolute phase thereof changes depending on the direction of the optical axis 54A derived from each of the rod-shaped liquid crystal compounds 54. At this time, the optical axis 54A changes along the arrangement axis A while rotating.

Therefore, a variation in the absolute phase of the incidence light $L_{11}$ varies depending on the direction of the optical axis 54A.

Further, the liquid crystal alignment pattern that is formed in the optically-anisotropic layer 53 is a pattern that is periodic in the arrow X direction. Therefore, as illustrated in FIG. 10, the incidence light $L_{11}$ transmitted through the optically-anisotropic layer 53 is imparted with an absolute phase Q3 that is periodic in the arrow X direction corresponding to the direction of each of the optical axes 54A. As a result, an equiphase surface E3 that is inclined in the arrow Z direction with respect to the XY plane is formed. Therefore, the incidence light $L_{11}$ is bent to be inclined in a direction perpendicular to the equiphase surface E3 and advances in a direction different from an advancing direction of the incidence light $L_1$. This way, the incidence light $L_1$ of the left circularly polarized light $P_L$ is converted into the transmitted light $L_2$ of the right circularly polarized light $P_R$ that is inclined by a predetermined angle with respect to the arrow Z direction.

On the other hand, in a case where incidence light $L_{12}$ of right circularly polarized light $P_R$ is incident into the optically-anisotropic layer 53 of the optical element, similarly, the incidence light $L_{12}$ transmits through the optically-anisotropic layer 53 to be imparted with a phase difference of 180° and is converted into transmitted light $L_2$ of left circularly polarized light $P_L$.

In addition, similarly, in a case where the incidence light $L_{12}$ transmits through the optically-anisotropic layer 53, an absolute phase thereof changes depending on the direction of the optical axis 54A derived from each of the rod-shaped liquid crystal compounds 54. Similarly, the optical axis 54A changes along the arrangement axis A while rotating. Therefore, a variation in the absolute phase of the incidence light $L_{12}$ varies depending on the direction of the optical axis 24A. Further, the liquid crystal alignment pattern that is formed in the optically-anisotropic layer 53 is a pattern that is periodic in the arrow X direction. Therefore, as illustrated in FIG. 10, the incidence light $L_{12}$ transmitted through the optically-anisotropic layer 53 is imparted with an absolute phase Q4 that is periodic in the arrow X direction corresponding to the direction of each of the optical axes 54A.

Here, the incidence light $L_{12}$ is right circularly polarized light $P_R$. Therefore, the absolute phase Q4 that is periodic in the arrow X direction corresponding to the direction of the optical axis 54A is opposite to the incidence light $L_{11}$ of the left circularly polarized light $P_L$. As a result, in the incidence light $L_{12}$, an equiphase surface E4 that is inclined opposite to that of the incidence light $L_{11}$ is formed.

Therefore, the incidence light $L_{12}$ of the left circularly polarized light $P_R$ is converted into transmitted light $L_{31}$ of right circularly polarized light $P_R$ that is inclined by a predetermined angle with respect to the arrow Z direction and advances toward the transmitted light $L_{21}$ of the right circularly polarized light $P_R$ converted from the incidence light $L_{11}$ of the left circularly polarized light $P_L$.

Accordingly, even in the stereoscopic image display device according to Embodiment 2 of the present invention, as in the stereoscopic image display device 10, the image 12R corresponding to observation with the right eye 2R is incident into the right eye 2R of the observer, and the image 12L corresponding to observation with the left eye 2L is incident into the left eye 2L of the observer. As a result, an excellent stereoscopic image can be displayed.

Embodiment 3

As in the stereoscopic image display device 10 according to Embodiment 1, a stereoscopic image display device according to Embodiment 3 of the present invention includes an optical element, a circularly polarizing plate, and a display panel. In addition, in the stereoscopic image display device according to Embodiment 3, the optical element includes a support and an optically-anisotropic layer, and the circularly polarizing plate includes a polarizer and an λ/4 plate. Further, as in Embodiment 1, as the circularly polarizing plate 31, a cholesteric layer may be used or a display that emits circularly polarized light may be used.

Basically, the stereoscopic image display device according to Embodiment 3 has the same configuration as the stereoscopic image display device 10 according to Embodiment 1, except that the optically-anisotropic layer of the optical element is different from that of Embodiment 1.

Figure 11:
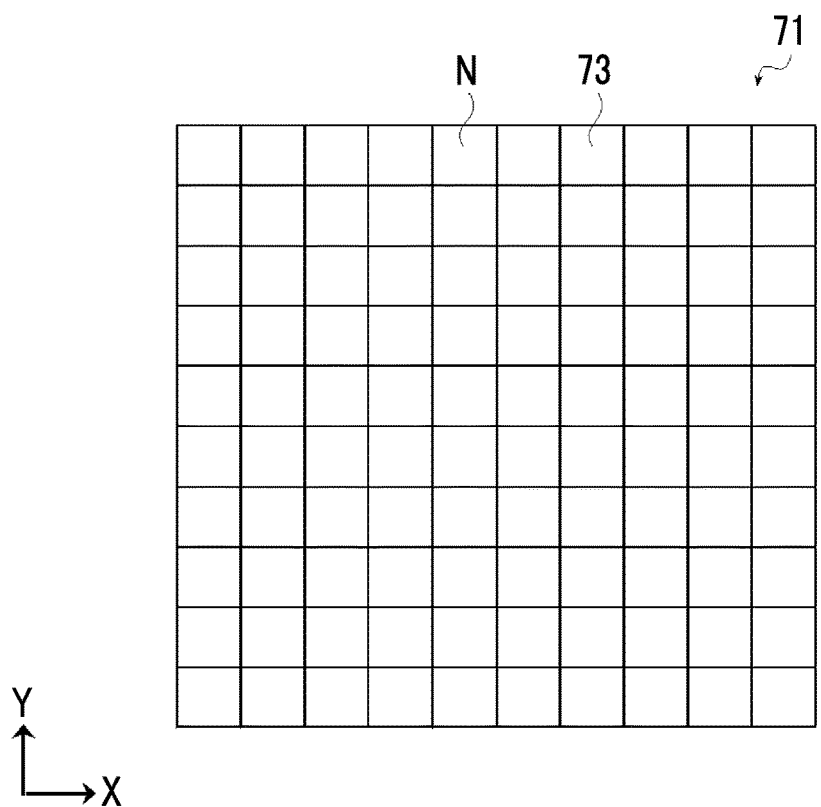
FIG. 11 is a partial plan view illustrating an optical element according to Embodiment 3 of the present invention.

FIG. 11 is a plan view illustrating an optical element 71 according to Embodiment 3.

An optically-anisotropic layer 73 of the optical element 71 according to Embodiment 3 includes a plurality of small regions N arranged in the arrow X direction and the arrow Y direction.

Figure 12:
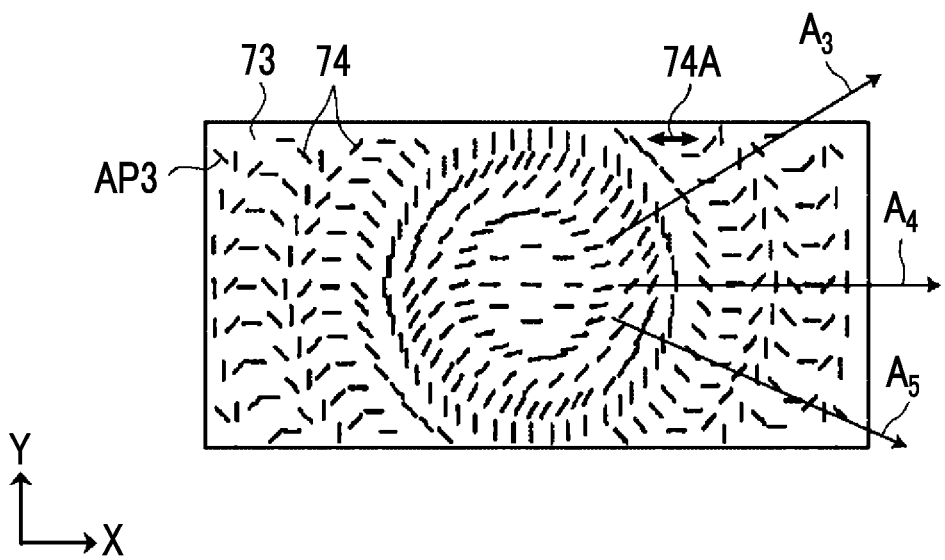
FIG. 12 is a diagram illustrating a liquid crystal alignment pattern according to Embodiment 3 of the present invention.

As illustrated in FIG. 12, the plurality of small regions N includes a plurality of rod-shaped liquid crystal compounds 74, and optical axes 74A of the plurality of rod-shaped liquid crystal compounds 74 form a liquid crystal alignment pattern AP3 illustrated in FIG. 12 in each of the small regions N. In the liquid crystal alignment pattern AP3 according to Embodiment 3, the direction of the optical axes 74A of the rod-shaped liquid crystal compounds 74 changes in a concentric circular shape while gradually rotating along multiple directions from the center of the liquid crystal alignment pattern AP3 to the outside, for example, along arrangement axes A3, A4, A5, . . . , and the like. Absolute phases of circularly polarized light components transmitted through the small regions N having the concentric circular liquid crystal alignment pattern AP3 change in individual local regions where the directions of the optical axes 74A of the rod-shaped liquid crystal compounds 74 are different. At this time, variations in the respective absolute phases vary depending on the directions of the optical axes 74A of the rod-shaped liquid crystal compounds 74 through which the circularly polarized light components have transmitted. It is preferable that a distance (pitch) in which the optical axis 74A of the liquid crystal compound 74 in the liquid crystal alignment pattern AP3 rotates by 180° changes from the center to the outside because the bending angle of circularly polarized light in a plane of the small region N can be changed.

In a case where the liquid crystal alignment pattern in which the optical axes radially change while rotating is provided, incidence light can be caused to transmit through the optically-anisotropic layer 73 as diverging light or converging light. That is, a function as a convex lens or a concave lens can be implemented by the liquid crystal alignment pattern AP3 in the optically-anisotropic layer 73.

Accordingly, the circularly polarized light transmits through the small region N of the optical element 71 according to Embodiment 3 such that the circularly polarized light transmitted through the small region N can be caused to advance in a state where it is bent to be inclined in all the directions in the XY plane.

That is, the optically-anisotropic layer 73 exhibits the same action as the lens array.

Figure 13:
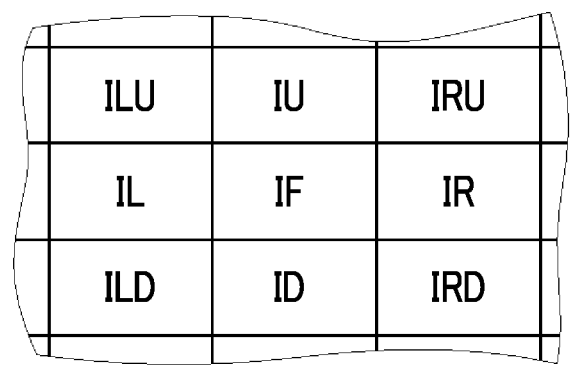
FIG. 13 is a plan view illustrating the display of a display panel according to Embodiment 3 of the present invention.

Accordingly, the display panel 11 can display a stereoscopic image corresponding to not only the horizontal direction but also the vertical direction and/or the oblique direction by displaying, for example, 9 images (3×3 images) corresponding to one small region N as illustrated in FIG. 13, the 9 images including an image IF observed from the front side, an image IR observed from the right side, an image IL observed from the left side, an image IU observed from the upper side, an image ID observed from the lower side, an image IRU observed from the upper right side, an image ILU observed from the upper left side, an image IRD observed from the lower right side, and an image ILD observed from the lower left side.

Further, it is preferable that the number of images corresponding to one small region N is increased from the viewpoint that a high-quality stereoscopic image such as so-called light field (integral photography) can be displayed.

Embodiment 4

As in the stereoscopic image display device 10 according to Embodiment 1, a stereoscopic image display device according to Embodiment 4 of the present invention includes an optical element, a circularly polarizing plate, and a display panel. In addition, in the stereoscopic image display device according to Embodiment 4, the optical element includes a support and an optically-anisotropic layer, and the circularly polarizing plate includes a polarizer and an λ/4 plate. Further, as in Embodiment 1, as the circularly polarizing plate 31, a cholesteric layer may be used or a display that emits circularly polarized light may be used.

Basically, the stereoscopic image display device according to Embodiment 4 has the same configuration as the stereoscopic image display device 10 according to Embodiment 1, except that the optically-anisotropic layer of the optical element is different from that of Embodiment 1.

The optically-anisotropic layers 23, 53, and 73 according to Embodiments 1 to 3 include the rod-shaped liquid crystal compounds 24, 54, and 74, respectively. The optically-anisotropic layer according to the present invention may include disk-shaped liquid crystal compounds.

Figure 14:
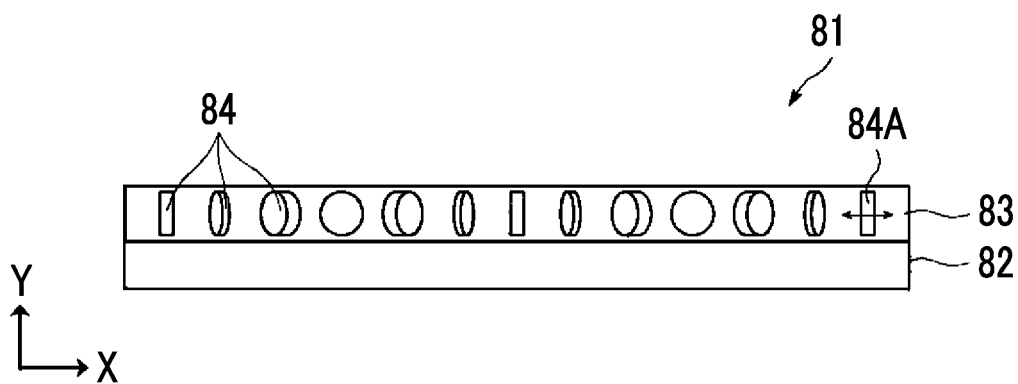
FIG. 14 is a partial side cross-sectional view illustrating an optical element according to Embodiment 4 of the present invention.

FIG. 14 is a side cross-sectional view illustrating a configuration of an optical element 81 according to Embodiment 4. As illustrated in FIG. 14, the optical element 81 according to Embodiment 4 has the same configuration as the optical element 21 according to Embodiment 1, except that an optically-anisotropic layer includes disk-shaped liquid crystal compounds 84. That is, the optical element 81 according to Embodiment 4 includes a substrate 82 and an optically-anisotropic layer 83 formed on the substrate 82. The optically-anisotropic layer 83 includes a plurality of disk-shaped liquid crystal compounds 84.

Each of the plurality of disk-shaped liquid crystal compounds 84 included in the optically-anisotropic layer 83 rises in the arrow Y direction, and an optical axis 84A of the disk-shaped liquid crystal compound 84 is defined as an axis perpendicular to a disk surface, that is, a so-called fast axis.

Figure 15:
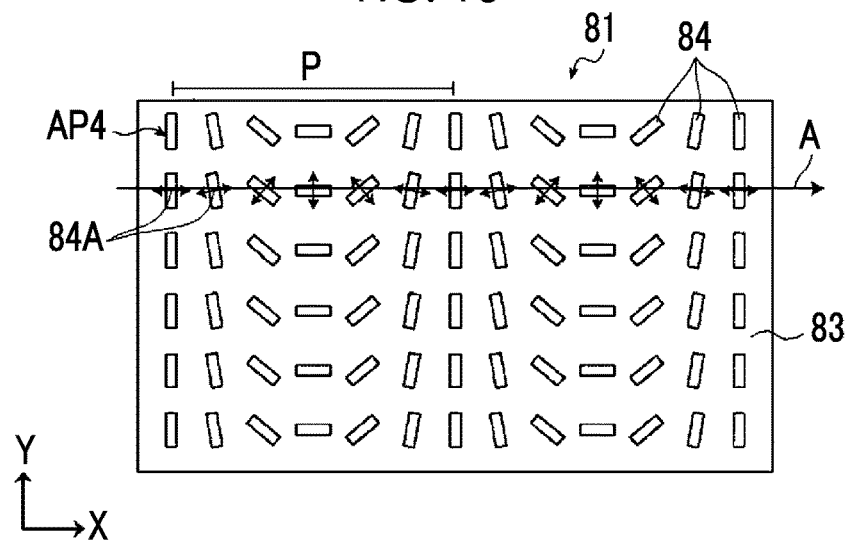
FIG. 15 is a partial plan view illustrating an optical element according to Embodiment 4 of the present invention.

FIG. 15 is a plan view illustrating the optical element 81 according to Embodiment 4. As illustrated in FIG. 15, the optical axis 84A of the disk-shaped liquid crystal compound 84 changes while continuously rotating along the arrangement axis A. That is, an angle between the arrangement axis and the optical axis 84A of the disk-shaped liquid crystal compound 84 gradually changes along the arrangement axis A. As a result, a liquid crystal alignment pattern AP4 having a pitch P is formed in the optically-anisotropic layer 83 according to Embodiment 4 as in the optically-anisotropic layer 23 according to Embodiment 1.

Therefore, the optical element 81 according to Embodiment 4 has the same function as that of the optical element 21 according to Embodiment 1. That is, although not illustrated in the drawing, a circularly polarized light component in light incident into the optically-anisotropic layer 83 of the optical element 81 can be caused to advance in a state where it is bent to be inclined in a direction different from the incidence direction, and a high-quality stereoscopic image can be displayed.

Hereinafter, the details of the optical element according to the present invention will be described.

<Support>

As the support, a transparent support is preferable, and examples thereof include a polyacrylic resin film such as polymethyl methacrylate, a cellulose resin film such as cellulose triacetate, and a cycloolefin polymer film (for example, trade name "ARTON", manufactured by JSR Corporation; or trade name "ZEONOR", manufactured by Zeon Corporation). The support is not limited to a flexible film and may be a non-flexible substrate such as a glass substrate.

<Optically-Anisotropic Layer>

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above. By forming an alignment film on the support, applying the liquid crystal composition to the alignment film, and curing the applied liquid crystal composition, the optically-anisotropic layer formed of the cured layer of the liquid crystal composition can be obtained. Although the optically-anisotropic layer functions as a so-called λ/2 plate, the present invention also includes an aspect where a laminate including the support and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

In addition, it is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a torsion component to liquid crystals or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

<Alignment Film for Forming Optically-Anisotropic Layer>

Examples of the alignment film for forming the optically-anisotropic layer include a rubbed film formed of an organic compound such as a polymer, an obliquely deposited film formed of an inorganic compound, a film having a micro-groove, and a film formed by lamination of Langmuir-Blodgett (LB) films formed with a Langmuir-Blodgett's method using an organic compound such as co-tricosanoic acid, dioctadecylmethylammonium chloride, or methyl stearate.

As the alignment film, a film obtained by rubbing a surface of a polymer layer can be used. The rubbing treatment is performed by rubbing a surface of a polymer layer with paper or fabric in a given direction multiple times. As the kind of the polymer used for the alignment layer, for example, polyimide, polyvinyl alcohol, a polymer having a polymerizable group described in JP1997-152509A (JP-H9-152509A), or a vertical alignment film such as JP2005-097377A, JP2005-099228A, and JP2005-128503A can be preferably used. The vertical alignment film described in the present invention refers to an alignment film in which a major axis of a molecule of the polymerizable rod-shaped liquid crystal compound according to the present invention is aligned to be substantially perpendicular to a rubbing direction of the vertical alignment film. The thickness of the alignment layer is not necessarily large as long as it can provide the alignment function, and is preferably 0.01 to 5 μm and more preferably 0.05 to 2 μm.

In addition, a so-called photo-alignment film obtained by irradiating a photo-alignable material with polarized light or non-polarized light can also be used. That is, the photo-alignment film may be prepared by applying the photo-alignable material to the support. The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslking polyimide, polyamide, or ester described in JP2003-520878A, JP2004-529220A, and JP4162850B; and a photodimerizable compound, in particular, a cinnamate (cinnamic acid) compound, a chalcone compound, or a phosphorus compound described in JP1997-118717A (JP-H9-118717A), JP1998-506420A (JP-H10-506420A), JP2003-505561A, WO2010/150748A, JP2013-177561A, and JP2014-012823A. Among these, an azo compound, a photocrosslinking polyimide, polyamide, ester, a cinnamate compound, or a chalcone compound is more preferable.

In the present invention, the photo-alignment film is preferably used.

The alignment film is applied to the support, is dried, and is exposed to laser to form the alignment pattern.

Figure 16:
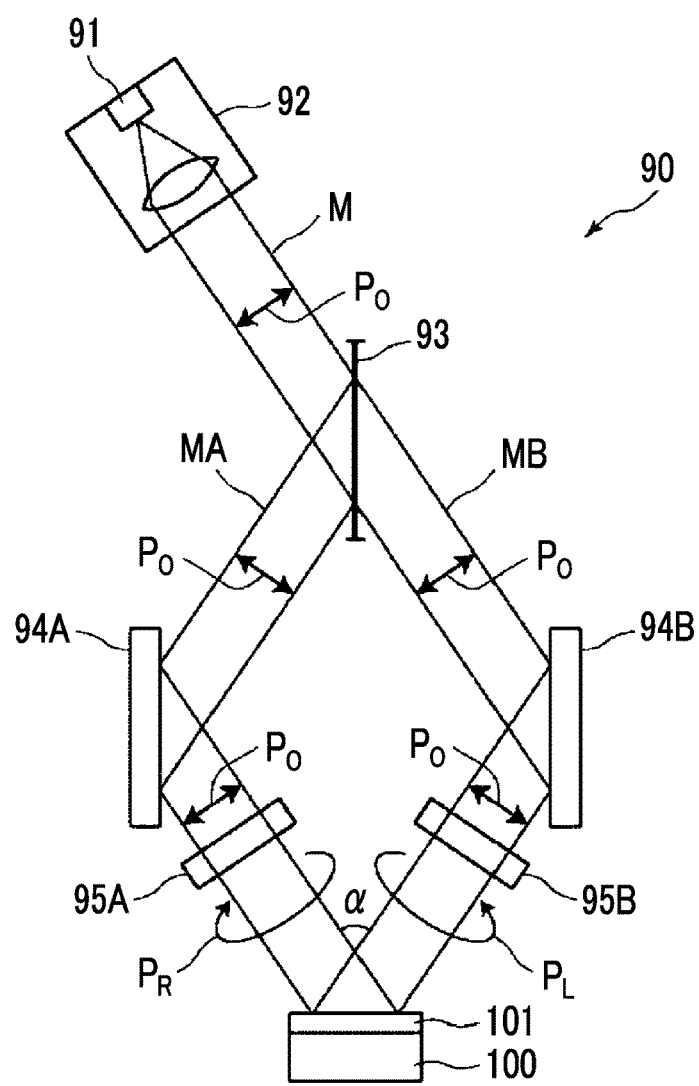
FIG. 16 is a diagram illustrating a schematic configuration of an exposure device that irradiates an alignment film with interference light.

FIG. 16 is a schematic diagram illustrating an exposure device for the alignment film. This exposure device corresponds to formation of the optically-anisotropic layer 23 illustrated in FIG. 4 and the optically-anisotropic layer 53 illustrated in FIG. 8.

An exposure device 90 includes: a light source 92 including a semiconductor laser 91; a beam splitter 93 that splits laser light M emitted from the semiconductor laser 91 into two beams MA and MB; mirrors 94A and 94B that are disposed on optical paths of the split two beams MA and MB; and λ/4 plates 95A and 95B. Here, although not illustrated in the drawing, the light source 92 includes a polarizing plate and emits linearly polarized light $P_0$. The λ/4 plates 95A and 95B have optic axes perpendicular to each other, the λ/4 plate 95A converts linearly polarized light $P_0$ into right circularly polarized light $P_R$, and the λ/4 plate 95B converts linearly polarized light $P_0$ into left circularly polarized light $P_L$.

A support 100 including an alignment film 101 is disposed at an exposed portion, the two beams MA and MB intersect and interfere each other on the alignment film 101, and the alignment film 101 is exposed to the interference light. Due to the interference at this time, the polarization state of light with which the alignment film 101 is irradiated periodically changes according to an interference pattern. As a result, in the alignment film 101, an alignment pattern in which the alignment state periodically changes can be obtained. In the exposure device 90, by changing an intersection angle α between the two beams MA and MB, the pitch (180° rotation pitch) of the alignment pattern can be changed. By forming the optically-anisotropic layer on the alignment film having the pattern in which the alignment state periodically changes, the optically-anisotropic layer having the liquid crystal alignment pattern corresponding to the period can be formed.

In addition, as in the optically-anisotropic layer 23 illustrated in FIG. 4, the optically-anisotropic layer having the regions in which the rotation directions of the optical axes 24A are opposite to each other can be formed as follows. For example, exposure is performed using the exposure device 90 by masking a region corresponding to one of the first region 23A or the second region 23b with a mask having a stripe shape in which an elongated light shielding portion and an elongated exposed portion (light transmitting portion) are alternately provided. Next, exposure is performed using the exposure device 90 by rotating a polarization direction of the laser light M emitted from the light source 92 by 90° and shifting the mask to mask the previously exposed region. As a result, the optically-anisotropic layer can be formed.

Figure 17:
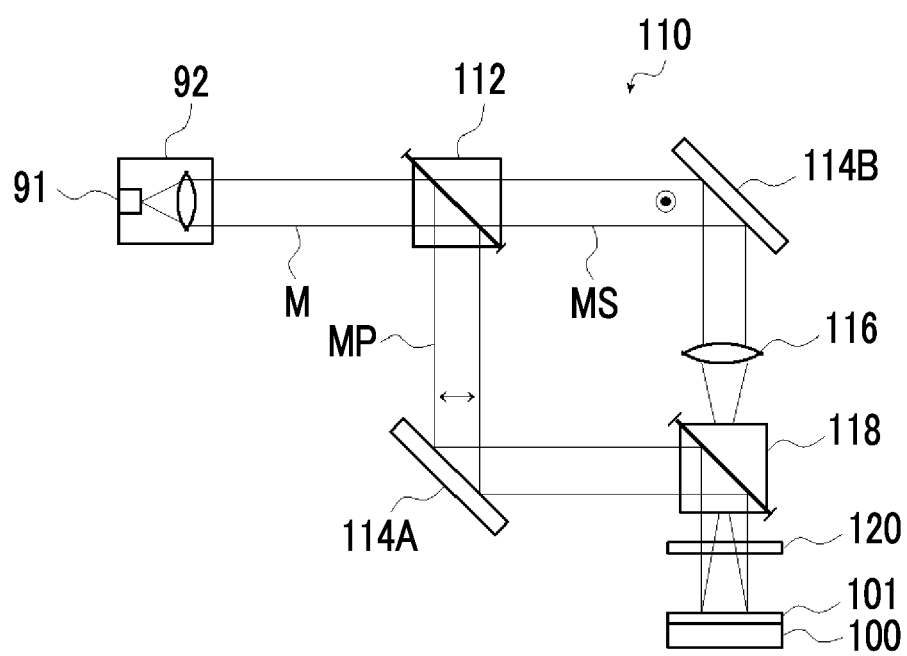
FIG. 17 is a diagram illustrating a schematic configuration of another exposure device that irradiates an alignment film with interference light.

FIG. 17 is a schematic diagram illustrating another example of an exposure device for the alignment film. This exposure device corresponds to formation of the optically-anisotropic layer 73 having the concentric circular liquid crystal alignment pattern illustrated in FIG. 12.

An exposure device 110 includes: the light source 92 including the semiconductor laser 91; a polarization beam splitter 112 that divides the laser light M emitted from the semiconductor laser 91 into S polarized light MS and P polarized light MP; a mirror 114A that is disposed on an optical path of the P polarized light MP; a mirror 114B that is disposed on an optical path of the S polarized light MS; a lens 116 that is disposed on the optical path of the S polarized light MS; a polarization beam splitter 118; and a λ/4 plate 120.

The P polarized light MP that is divided by the polarization beam splitter 112 is reflected from the mirror 114A to be incident into the polarization beam splitter 118. On the other hand, the S polarized light MS that is divided by the polarization beam splitter 112 is reflected from the mirror 114B and is collected by the lens 116 to be incident into the polarization beam splitter 118.

The P polarized light MP and the S polarized light MS are multiplexed by the polarization beam splitter 118, are converted into right circularly polarized light and left circularly polarized light by the λ/4 plate 120 depending on the polarization direction, and are incident into the alignment film 101 on the support 100.

Due to interference between the right circularly polarized light and the left circularly polarized light, the polarization state of light with which the alignment film 101 is irradiated periodically changes according to an interference pattern. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 101, a concentric circular alignment pattern in which the alignment state periodically changes can be obtained.

By performing the above-described exposure using a quadrangular mask while changing the position of the mask, the optically-anisotropic layer 73 in which the small regions N having the concentric circular liquid crystal alignment pattern illustrated in FIG. 12 are two-dimensionally arranged as illustrated in FIG. 11 can be formed.

In addition, the pitch (180° rotation pitch) of the liquid crystal alignment pattern can be controlled by changing the F number of the lens 116, the focal length of the lens 116, the distance between the lens 116 and the alignment film 101, and the like.

Further, by using the lens 16 in the lens array, the optically-anisotropic layer 73 in which the small regions N having the concentric circular liquid crystal alignment pattern are two-dimensionally arranged can also be formed without using the quadrangular mask.

<Formation of Optically-Anisotropic Layer>

The optically-anisotropic layer may be formed by applying multiple layers of the liquid crystal composition to the alignment film. The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer is formed by the application of the multiple layers such that the total thickness of the optically-anisotropic layer is large, the alignment direction of the alignment film can be reflected from a lower surface of the optically-anisotropic layer to an upper surface thereof.

By bonding the support and the optically-anisotropic layer obtained as described above using an adhesive layer, an optical element in which the support and the optical element are laminated can be obtained.

Examples of a pressure sensitive adhesive used for the adhesive layer include a resin such as a polyester resin, an epoxy resin, a polyurethane resin, a silicone resin, or an acrylic resin. Among these examples, one kind alone or a mixture of two or more kinds may be used. In particular, an acrylic resin is preferable from the viewpoints that, for example, reliability such as water fastness, heat resistance, or light fastness is excellent, adhesion force or transparency is excellent, and the refractive index is easily adjustable to be suitable for a liquid crystal display.

<Wearable Display Device>

A wearable display device according to an embodiment of the present invention includes: the stereoscopic image display device according to the embodiment of the present invention; and an eyepiece for collecting an image (outgoing light) displayed by the stereoscopic image display device.

The wearable display device according to the embodiment of the present invention is basically the same as a well-known wearable display device such as a head-mounted display or a spectacle-type wearable display that displays a stereoscopic image, except that the stereoscopic image display device according to the embodiment of the present invention is used.

In the above-described example, for example, an image for the right eye 2R and an image for the left eye 2L are displayed on the single display panel 11.

However, the stereoscopic image display device according to the embodiment of the present invention is not limited to this example. For example, two stereoscopic image display devices may be combined to configure one stereoscopic image display device, the two stereoscopic image display devices including a stereoscopic image display device that displays a plurality of images for the right eye and a stereoscopic image display device that displays a plurality of images for the left eye.

Alternatively, the stereoscopic image display device according to the embodiment of the present invention may be configured using two display panels 11 such that only an image for the left eye is displayed on one display panel 11 and only an image for the right eye is displayed on one display panel 11. At this time, it is necessary to completely separate an optical path for the right eye side and an optical path for the left eye side using a partition or the like.

With this configuration, a stereoscopic image having a higher stereoscopic effect can be displayed.

EXAMPLES

Examples and Comparative Examples of the optical element according to the present invention will be described.

Example 1 (Embodiment 3)

An optical element A was prepared using the following method.
[Preparation of Optically-Anisotropic Layer H-1]
(Saponification of Support)

As the support, a commercially available triacetyl cellulose (Z-TAC, manufactured by Fuji Film Co., Ltd.) was used.

The support was caused to pass through an induction heating roll at a temperature of 60° C. such that the support surface temperature was increased to 40° C. Next, an alkali solution shown below was applied to a single surface of the support using a bar coater in an application amount of 14 mL (liter)/m² (liter)/m$^2$, the support was heated to 110° C., and the support was transported for 10 seconds under a steam infrared electric heater (manufactured by Noritake Co., Ltd.). Next, 3 mL/m$^2$ of pure water was applied to the support surface using the same bar coater. Next, water cleaning using a foundry coater and water draining using an air knife were repeated three times, and then the support was transported and dried in a drying zone at 70° C. for 10 seconds. As a result, the support having undergone the alkali saponification treatment was obtained.

<Alkali Solution>

| | |
|---|---|
| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the support having undergone the alkali saponification treatment using a #8 wire bar. The support on which the coating film was formed was dried using warm air at 60° C. for 60 seconds and was dried using warm air at 100° C. for 120 seconds. As a result, an undercoat layer was formed.

<Undercoat Layer-Forming Coating Solution>

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

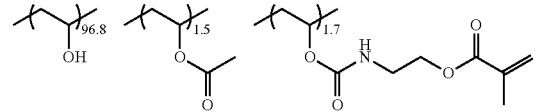

(Formation of Alignment Film P-1)

The following alignment film P-1-forming coating solution was continuously applied to the support on which the undercoat layer was formed using a #2 wire bar. The support on which the coating film of the alignment film P-1-forming coating solution was formed was dried using a hot plate at 60° C. for 60 seconds. As a result, an alignment film P-1 was formed.

<Alignment Film P-1-Forming Coating Solution>

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

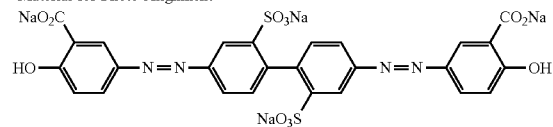

(Exposure of Alignment Film P-1)

The alignment film was exposed using the exposure device 110 illustrated in FIG. 17.

In the exposure device 110, a laser that emits laser light having a wavelength (405 nm) was used as the semiconductor laser 91. The exposure dose of the interference light was 100 mJ/cm$^2$.

In addition, the exposure was performed using a mask having a quadrangular opening such that a portion other than the opening was not exposed. The exposure of the alignment film P-1 was performed by shifting the mask and repeating a step of exposing an adjacent portion. The rotation pitch of the pattern formed by interference between the two laser beams was controlled by changing the F number of the lens, the focal length of the lens, and the distance between the lens and the alignment film P-1 surface.

This alignment film corresponds to the optical element (the optically-anisotropic layer) having the concentric circular liquid crystal alignment pattern according to Embodiment 3 illustrated in FIG. 12.

(Formation of Optically-Anisotropic Layer H-1)

As the optically-anisotropic layer, a layer formed of a reverse dispersion liquid crystal compound was formed. The optically-anisotropic layer was formed by applying multiple layers of the following composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 110° C., the coating film was cooled to 60° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 m.

Regarding the second or subsequent liquid crystal layer, the composition was applied to the first liquid crystal layer, and the applied composition was heated, cooled, and irradiated with ultraviolet light for curing under the same conditions as those of the preparation of the first liquid crystal layer. As a result, a liquid crystal immobilized layer was prepared. This way, by repeating the application multiple times until the total thickness reached a desired thickness, an optically-anisotropic layer H-1 was obtained, and an optical element A was prepared.

Finally, $\Delta n_{550} \times d$ (Re(550)_ of the liquid crystals was 275 nm, and it was verified using a polarizing microscope that periodic alignment occurred on the surface. Hereinafter, "$\Delta n_{550} \times d$" and the like were measured as described above.

<Composition A-1>

| | |
|---|---|
| The following liquid crystal compound L-1 | 42.00 parts by mass |
| The following liquid crystal compound L-2 | 42.00 parts by mass |
| The following liquid crystal compound L-3 | 16.00 parts by mass |
| The following polymerization initiator PI-1 | 0.50 parts by mass |
| The following leveling agent T-1 | 0.50 parts by mass |
| Methyl ethyl ketone | 176.00 parts by mass |
| Cyclopentanone | 44.00 parts by mass |

-Liquid Crystal Compound L-1-

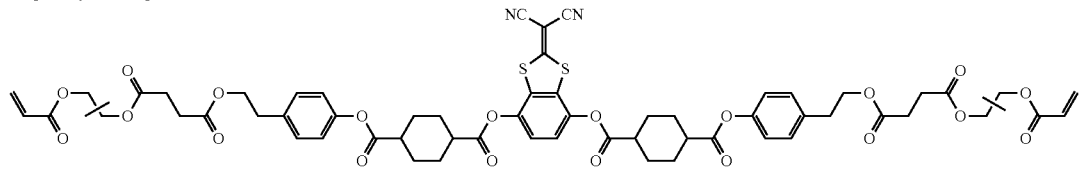

Me Position Isomer Mixture

-Liquid Crystal Compound L-2-

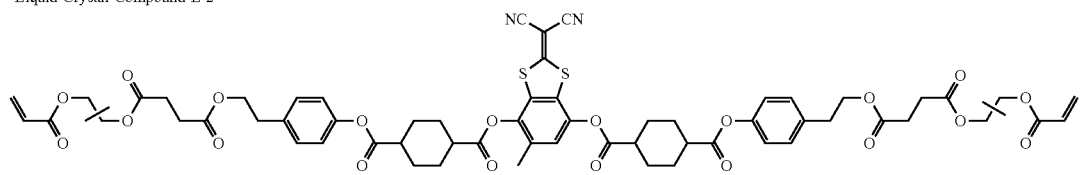

Me Position Isomer Mixture

-Liquid Crystal Compound L-3-

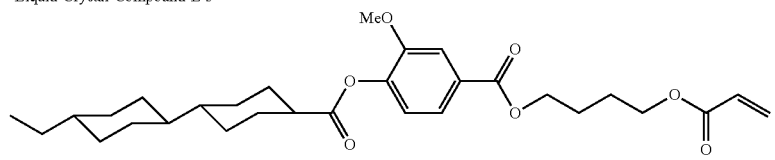

-Polymerization initiator PI-1-

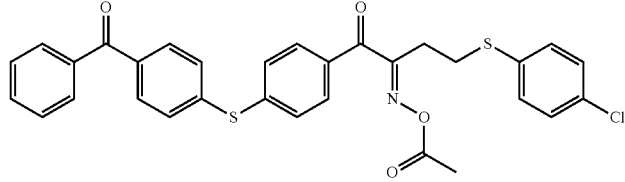 [SMILES: CC(=O)O/N=C(\CCSc1ccc(Cl)cc1)C(=O)c1ccc(Sc2ccc(C(=O)c3ccccc3)cc2)cc1]

-Leveling Agent T-1-

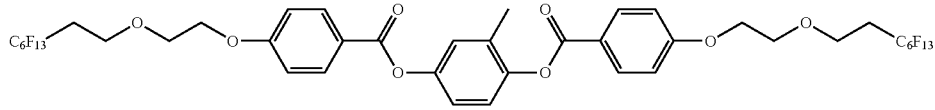

[Preparation of λ/4 Plate]

A λ/4 plate was prepared using the following method.

First, the support on which the undercoat layer was formed was prepared using the same method as that of the optical element A.

(Formation of Alignment Film P-2)

The following alignment film P-2-forming coating solution was continuously applied to the support on which the undercoat layer was formed using a #2.4 wire bar. The support on which the coating film of the alignment film P-2-forming coating solution was formed was dried using a hot plate at 80° C. for 5 minutes. As a result, an alignment film P-2 was formed.

<Alignment Film P-2-Forming Coating Solution>

| | |
|---|---|
| The following material for photo-alignment polymer A2 | 4.35 parts by mass |
| The following low molecular weight compound B2 | 0.80 parts by mass |
| The following crosslinking agent C1 | 2.20 parts by mass |
| The following compound D1 | 0.48 parts by mass |
| The following compound D2 | 1.15 parts by mass |
| Butyl acetate | 100.00 parts by mass |

—Polymer A2—

100.0 parts by mass of 2-(3,4-epoxycyclohexyl)ethyltrimethoxysilane, 500 parts by mass of methyl isobutyl ketone, and 10.0 parts by mass of triethylamine were charged into a reaction vessel equipped with a stirrer, a thermometer, a dripping funnel, and a reflux cooling pipe and were mixed with each other at room temperature. Next, 100 parts by mass of deionized water was dropped for 30 minutes using a dripping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid In a case where the epoxy-containing polyorganosiloxane was analyzed by nuclear magnetic resonance ($^1$H-NMR), a peak having a theoretical intensity based on an oxiranyl group was obtained in the vicinity of chemical shift (δ)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, co-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times. An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

—Polymer A2—

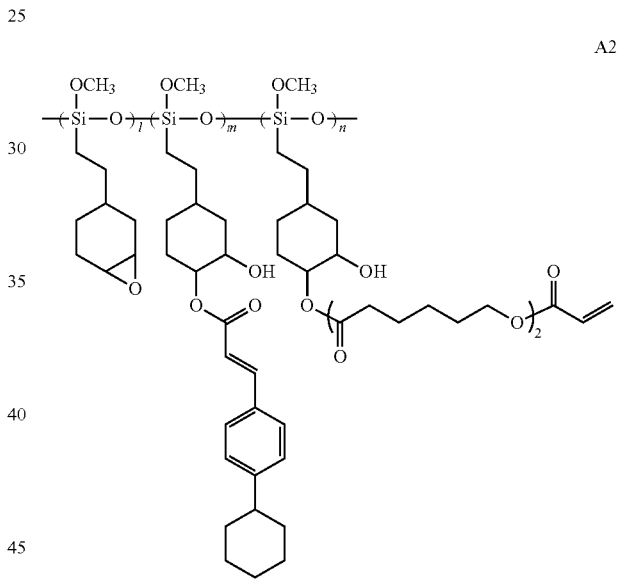

—Low Molecular Weight Compound B2—

The low molecular weight compound B2 shown in the following table (manufactured by Nissin Ion Equipment Co, Ltd., NOMCOAT TAB) was used.

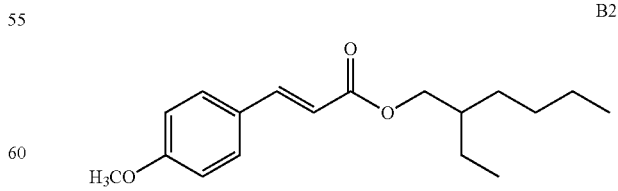

—Crosslinking Agent C1—

The crosslinking agent C1 (manufactured by Nagase ChemteX Corporation, DENACOL EX411) shown in the following table was used.

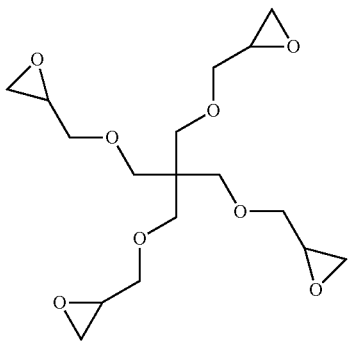

—Compound D1—
The following compound D1 (manufactured by Kawaken Fine Chemicals Co., Ltd., ALUMINUM CHELATE A(W)) shown in the following table was used.

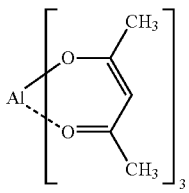

—Compound D2—
The compound D2 (manufactured by Toyo Science Corp., triphenylsilanol) shown in the following table was used.

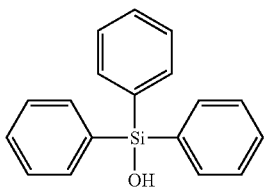

(Exposure of Alignment Film P-2)
By irradiating the obtained alignment film P-2 with polarized ultraviolet light (20 mJ/cm², using an extra high pressure mercury lamp), the alignment film was exposed.

[Preparation of Optically-Anisotropic Layer QA-1]
As an optically-anisotropic layer QA-1, a layer formed of reverse dispersion liquid crystals was formed.

The optically-anisotropic layer was formed by applying the following composition QA-1 to the alignment film P-2. The applied coating film was heated using a hot plate at 110° C., the coating film was cooled to 60° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized.

The thickness of the liquid crystal layer was 2.3 µm. In the obtained optically-anisotropic layer, $\Delta n_{550} \times d$ (Re(550)) was 138 nm.

<Composition QA-1>

| | |
|---|---|
| The above-described liquid crystal compound L-1 | 42.00 parts by mass |
| The above-described liquid crystal compound L-2 | 42.00 parts by mass |
| The above-described liquid crystal compound L-3 | 16.00 parts by mass |
| The above-described polymerization initiator PI-1 | 0.50 parts by mass |
| The following leveling agent G-1 | 0.20 parts by mass |
| Methyl ethyl ketone | 176.00 parts by mass |
| Cyclopentanone | 44.00 parts by mass |

-Leveling Agent G-1-

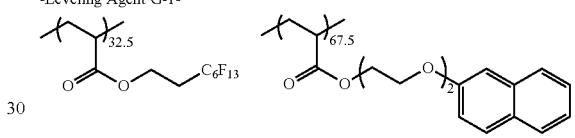

[Preparation of Optically-Anisotropic Layer QC-1]
As an optically-anisotropic layer QC-1, a layer formed of a reverse dispersion liquid crystal compound was formed.

The optically-anisotropic layer QC-1 was formed by applying the following composition C-1 to the optically-anisotropic layer QA-1. The applied coating film was heated using a hot plate at 70° C., the coating film was cooled to 65° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized. As a result, a λ/4 plate was obtained.

The thickness of the liquid crystal layer was 0.8 µm. In the obtained optically-anisotropic layer, the thickness-direction retardation Rth(550) was −60 nm.

<Composition C-1>

| | |
|---|---|
| The above-described liquid crystal compound L-1 | 44.00 parts by mass |
| The above-described liquid crystal compound L-2 | 22.00 parts by mass |
| The following liquid crystal compound L-4 | 34.00 parts by mass |
| The following polymerization initiator PI-1 | 1.50 parts by mass |
| The following leveling agent T-2 | 0.40 parts by mass |
| The following leveling agent T-3 | 0.20 parts by mass |
| The following compound S-1 | 0.50 parts by mass |
| The following compound M-1 | 14.00 parts by mass |
| Methyl ethyl ketone | 248.00 parts by mass |

Liquid Crystal Compound L-4

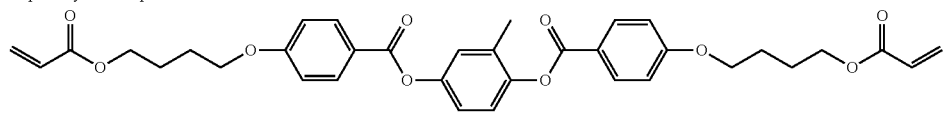

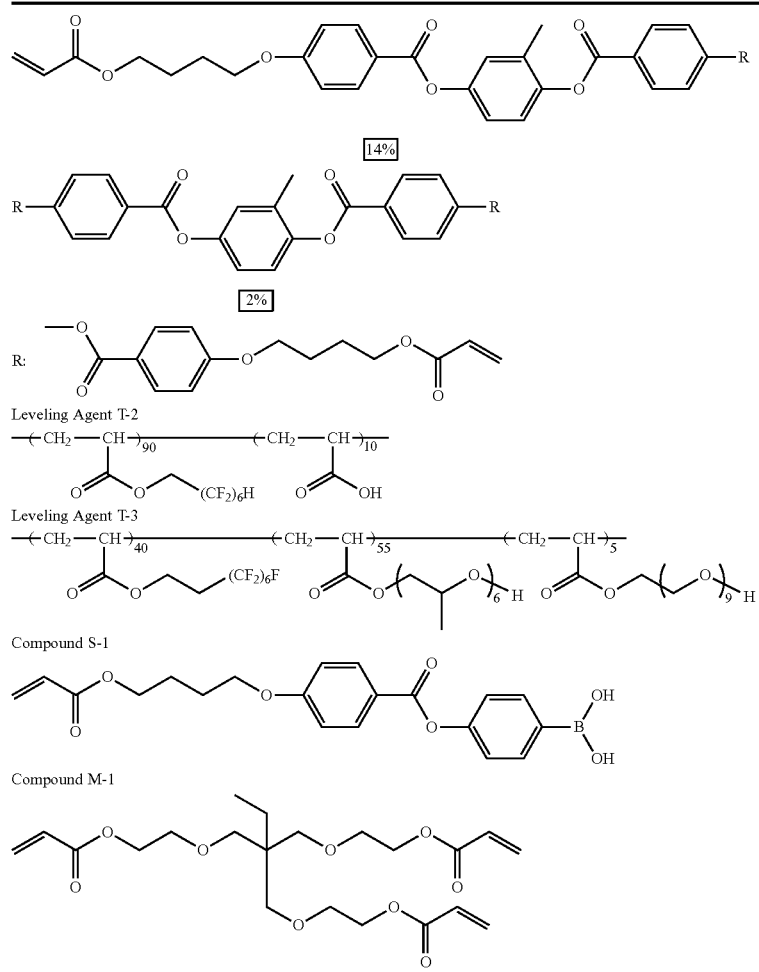

[Preparation of Circularly Polarizing Plate]

A polarizing plate was bonded to the triacetyl cellulose film side of the λ/4 plate through a pressure sensitive adhesive to obtain a circularly polarizing plate.

Example 2 (Embodiment 1)

An optical element A was prepared using the same method as that of Example 1, except that the alignment film P-1 was exposed as follows during the preparation of the optical element A.

(Exposure of Alignment Film P-1)

The alignment film P-1 was exposed using the exposure device 90 illustrated in FIG. 16.

In the exposure device 90, a laser that emits laser light having a wavelength (405 nm) was used as the semiconductor laser 91. The exposure dose of the interference light was 100 mJ/cm$^2$.

Here, the exposure was performed using a stripe shape (the light shielding portion, the exposed portion) such that a light shielding masked portion was not exposed. Next, the mask was shifted, first irradiation of laser light was performed, and an adjacent portion was exposed in a direction perpendicular to the polarization direction of the laser light to expose the alignment film P-1. The pitch (180° rotation pitch) of a pattern formed by interference of two laser beams was controlled by changing an intersection angle α between the two beams.

The alignment film formed using this exposure method corresponds to the optical element (optically-anisotropic layer) according to Embodiment 1 having the first region and the second region in which the rotation directions of the optical axes of the liquid crystal compounds were opposite to each other as illustrated in FIGS. 4 and 5.

Example 3 (Embodiment 2)

An optical element was prepared using the same method as that of Example 1, except that the optical element A was prepared by changing the exposure of the alignment film P-1 as follows and the λ/4 plate and the circularly polarizing plate were prepared by changing the exposure of the alignment film P-2 as follows.

(Exposure of Alignment Film P-1)

The alignment film P-1 was exposed using the exposure device 90 illustrated in FIG. 16.

In the exposure device 90, a laser that emits laser light having a wavelength (405 nm) was used as the semiconductor laser 91. The exposure dose of the interference light was 100 mJ/cm$^2$. The entire surface was uniformly exposed without using the mask having a stripe shape. The pitch (180° rotation pitch) of a pattern formed by interference of two laser beams was controlled by changing an intersection angle α between the two beams.

The alignment film formed using this exposure method corresponds to the optical element (optically-anisotropic layer) according to Embodiment 2 in which the rotation directions of the optical axes of the liquid crystal compounds were the same over the entire surface as illustrated in FIG. 8.

(Exposure of Alignment Film P-2)

By irradiating the alignment film P-2 with polarized ultraviolet light (20 mJ/cm$^2$, using an extra high pressure mercury lamp), the alignment film was exposed. Light of an extra high pressure mercury lamp was converted into linearly polarized light by transmitting through the polarizer.

Here, the exposure was performed using a stripe shape (the light shielding portion, the exposed portion) such that a light shielding masked portion was not exposed. The mask was shifted, the polarizer was rotated, first irradiation of polarized ultraviolet light was performed, and an adjacent portion was exposed in a direction perpendicular to the polarization direction of irradiation light to expose the alignment film P-1.

The alignment film formed using this exposure method corresponds to the λ/4 plate according to Embodiment 2 having the first phase difference region and the second phase difference region in which the slow axes are perpendicular to each other as illustrated in FIG. 9.

Example 4 (Embodiment 3)

An optical element was prepared by using an optically-anisotropic layer having forward dispersion liquid crystals instead of the optically-anisotropic layer H-1 during the preparation of the optical element A according to Example 1 and using an optically-anisotropic layer having forward dispersion liquid crystals instead of the optically-anisotropic layer QA-1 during the preparation of the λ/4 plate.

In the step of preparing the optical element A according to Example 1, the following composition A-2 was used instead of the composition A-1. The optical element was formed by applying the composition A-2 to the alignment film P-1.

The multiple-layer application method was the same as that of Example 1, except that the heating temperature on the hot plate was 90° C. and $\Delta n_{550} \times d$ (Re(550)) was 275 nm.

<Composition A-2>

| | |
|---|---|
| The above-described liquid crystal compound L-4 | 100.00 parts by mass |
| Polymerization initiator (manufactured by BASF SE, IRGACURE (registered trade name) 907) | 3.00 parts by mass |
| Photosensitizer (manufactured by Nippon Kayaku Co., Ltd., KAYACURE DETEX-S) | 1.00 part by mass |
| Leveling agent T-1 | 0.50 parts by mass |
| Methyl ethyl ketone | 211.00 parts by mass |

In the step of preparing the λ/4 plate according to Example 1, the following composition QA-2 was used instead of the composition QA-1. The λ/4 plate was formed by applying the composition QA-2 to the alignment film P-2.

The layer application method was the same as that of Example 1, except that the heating temperature on the hot plate was 90° C. and $\Delta n_{550} \times d$ (Re(550)) was 138 nm.

<Composition QA-2>

| | |
|---|---|
| The above-described liquid crystal compound L-4 | 100.00 parts by mass |
| Polymerization initiator (manufactured by BASF SE, IRGACURE (registered trade name) 907) | 3.00 parts by mass |
| Photosensitizer (manufactured by Nippon Kayaku Co., Ltd., KAYACURE DETEX-S) | 1.00 part by mass |
| Leveling agent G-1 | 0.20 parts by mass |
| Methyl ethyl ketone | 211.00 parts by mass |

[Evaluation]

Evaluation was performed as follows.

The circularly polarizing plate and the optical element A were bonded to iPhone 7 Plus (registered trade name, hereinafter, the same can be applied; manufactured by Apple Inc.) such that the circularly polarizing plate, the λ/4 plate, and the optical element A were disposed in this order from an image display portion side. At this time, the components were bonded through a pressure sensitive adhesive.

Parallax images were displayed on the image display portion to perform the following evaluation.

In addition, in Comparative Examples, Parallax images were displayed on the image display portion of iPhone 7 Plus (manufactured by Apple Inc.) to perform same evaluation.

<Stereoscopic Visibility>

Parallax images were displayed on the image display portion and stereoscopic visibility was observed by visual inspection to perform the evaluation based on the following four grades. It is preferable that a clear stereoscopic display image was visually recognized.

A: the stereoscopic display image was clearly visually recognized

B: the stereoscopic display image was visually recognized, blurriness was visually recognized, but the degree thereof was small C: the stereoscopic display image was visually recognized, blurriness was visually recognized, but the degree thereof was in an allowable range D: the stereoscopic display image was not visually recognized The characteristics and evaluation results of the optical element A and the λ/4 plate are shown in Table 1.

TABLE 1

| | | Example 1 (Embodiment 3) | Example 2 (Embodiment 1) | Example 3 (Embodiment 2) | Example 4 (Embodiment 3) | Comparative Example (—) |
|---|---|---|---|---|---|---|
| Optical Element | (Liquid Crystal) Composition | A-1 | A-1 | A-1 | A-2 | None |
| | Re(550)[nm] | 275 | 275 | 275 | 275 | |
| | Re(450)/Re(550) | 0.86 | 0.86 | 0.86 | 1.09 | |
| | 180° Rotation Pitch [μm] | 2 | 2 | 2 | 2 | |
| λ/4 Plate | (Liquid Crystal) Composition | QA-1 | QA-1 | QA-1 | QA-2 | None |

TABLE 1-continued

|  |  | Example 1 (Embodiment 3) | Example 2 (Embodiment 1) | Example 3 (Embodiment 2) | Example 4 (Embodiment 3) | Comparative Example (—) |
|---|---|---|---|---|---|---|
|  | Re(550)[nm] | 138 | 138 | 138 | 138 |  |
|  | Re(450)/Re(550) | 0.86 | 0.86 | 0.86 | 1.09 |  |
| Evaluation | Stereoscopic Visibility Horizontal Direction | A | A | A | B | D |
|  | Stereoscopic Visibility Vertical Direction | A | B | B | B | D |

The pitch (180° rotation pitch) of the liquid crystal alignment pattern was measured by observation with a polarizing microscope. Regarding the pitch of the liquid crystal alignment pattern, Table 1 shows the pitch in each of the centers of the first region and the second region in Embodiment 1, the pitch in each of the centers of the regions corresponding to the first phase difference region and the second phase difference region in Embodiment 2, and the pitch at a position spaced from the center by a NP/4 pitch in Embodiment 3, where NP represents the pitch of the small region N.

It was able to be seen from the results of Table 1 that a high-quality stereoscopic image can be seen with the stereoscopic image display device according to the embodiment of the present invention.

As can be seen from the above results, the effects of the present invention are obvious.

The present invention is suitably applicable to various stereoscopic image display uses, a head-mounted display, and the like.

EXPLANATION OF REFERENCES

2L: left eye
2R: right eye
10: stereoscopic image display device
11: display panel
12L, 12R: image
21, 71, 81: optical element
22, 100: support
23, 53, 73: optically-anisotropic layer
23A: first region
23B: second region
24, 54, 74: rod-shaped liquid crystal compound
24A, 54A, 74A, 84A: optical axis
31: circularly polarizing plate
31A: polarizer
31B, 33: λ/4 plate
33A: first phase difference region
33B: second phase difference region
34A, 34B: slow axis
84: disk-shaped liquid crystal compound
90, 110: exposure device
91: semiconductor laser
92: light source
93: beam splitter
94A, 94B, 114A, 114B: mirror
95A, 95B, 120: λ/4 plate
112, 118: polarization beam splitter
101: alignment film
A, A3, A5: arrangement axis
AP1, AP2, AP3: liquid crystal alignment pattern
d: thickness
E1, E2, E3, E4: equiphase surface
ID, IF, IL, ILD, ILU, IR, IRD, IRU, IU: image
$L_1$, $L_{11}$, $L_{12}$: incidence light
$L_2$, $L_3$, $L_{21}$, $L_{31}$: transmitted light
M: laser light
MA, MB: beam
MP: P polarized light
MS: S polarized light
N: small region
O: region
P: pitch
PL: left circularly polarized light
PR: right circularly polarized light
PO: linearly polarized light
Q1, Q2, Q3, Q4: absolute phase
α: intersection angle

What is claimed is:

1. A stereoscopic image display device comprising:
a display panel;
an optical element; and
a circularly polarizing plate,
wherein the optical element includes an optically-anisotropic layer that is formed of a composition including a liquid crystal compound,
the optically-anisotropic layer has a liquid crystal alignment pattern in which a direction of an optical axis derived from the liquid crystal compound changes while continuously rotating along at least one in-plane direction of the optically-anisotropic layer,
the optically-anisotropic layer causes a part of a circularly polarized light component incident into the optically-anisotropic layer among light components emitted through a plurality of pixels of the display panel to advance in a direction different from a direction in which the part of the circularly polarized light component is incident,
the optically-anisotropic layer is formed of a cured layer of the composition including the liquid crystal compound, and
the liquid crystal alignment pattern of the liquid crystal compound is immobilized in the optically-anisotropic layer.

2. A stereoscopic image display device comprising: a display panel that emits circularly polarized light; and
an optical element,
wherein the optical element includes an optically-anisotropic layer that is formed of a composition including a liquid crystal compound,
the optically-anisotropic layer has a liquid crystal alignment pattern in which a direction of an optical axis derived from the liquid crystal compound changes while continuously rotating along at least one in-plane direction of the optically-anisotropic layer,
the optically-anisotropic layer causes a part of a circularly polarized light component incident into the optically-anisotropic layer among light components emitted through a plurality of pixels of the display panel to advance in a direction different from a direction in which the part of the circularly polarized light component is incident, and the optically-anisotropic layer is formed of a cured layer of the composition including the liquid crystal compound, and the liquid crystal alignment pattern of the liquid crystal compound is immobilized in the optically-anisotropic layer.

3. The stereoscopic image display device according to claim 1, wherein the liquid crystal alignment pattern is a concentric circular alignment pattern in which the direction of the optical axis changes while continuously rotating along one direction in a concentric circular shape from an inside to an outside of the liquid crystal alignment pattern, and in the optically-anisotropic layer, small regions having the concentric circular alignment pattern are two-dimensionally arranged.

4. The stereoscopic image display device according to claim 2, wherein the liquid crystal alignment pattern is a concentric circular alignment pattern in which the direction of the optical axis changes while continuously rotating along one direction in a concentric circular shape from an inside to an outside of the liquid crystal alignment pattern, and in the optically-anisotropic layer, small regions having the concentric circular alignment pattern are two-dimensionally arranged.

5. The stereoscopic image display device according to claim 3, wherein in the concentric circular liquid crystal alignment pattern, a distance in which the optical axis rotates by 180° changes from an inside to an outside of the concentric circular liquid crystal alignment pattern.

6. The stereoscopic image display device according to claim 3, wherein the display panel displays a plurality of different images corresponding to one small region.

7. The stereoscopic image display device according to claim 1, wherein the liquid crystal alignment pattern has a first alignment pattern and a second alignment pattern in which directions of optical axes continuously change along one direction and rotation directions of the optical axes are opposite to each other, and in the optically-anisotropic layer, a first region and a second region are alternately arranged in the direction in which the direction of the optical axis of the liquid crystal alignment pattern changes, the first region having the first alignment pattern and being elongated in a direction perpendicular to the direction in which the direction of the optical axis of the liquid crystal alignment pattern changes, and the second region having the second alignment pattern and being elongated in the direction perpendicular to the direction in which the direction of the optical axis of the liquid crystal alignment pattern changes.

8. The stereoscopic image display device according to claim 2, wherein the liquid crystal alignment pattern has a first alignment pattern and a second alignment pattern in which directions of optical axes continuously change along one direction and rotation directions of the optical axes are opposite to each other, and in the optically-anisotropic layer, a first region and a second region are alternately, arranged in the direction in which the direction of the optical axis of the liquid crystal alignment pattern changes, the first region having the first alignment pattern and being elongated in a direction perpendicular to the direction in which the direction of the optical axis of the liquid crystal alignment pattern changes, and the second region having the second alignment pattern and being elongated in the direction perpendicular to the direction in which the direction of the optical axis of the liquid crystal alignment pattern changes.

9. The stereoscopic image display device according to claim 7, wherein in each of the first region and the second region of the liquid crystal alignment pattern, a distance in which the optical axis rotates by 180° changes from one end to another end of the region in the direction in which the direction of the optical axis of the liquid crystal alignment pattern changes.

10. The stereoscopic image display device according to claim 7, wherein the display panel displays a plurality of different images corresponding to a combination of one first region and one second region.

11. The stereoscopic image display device according to claim 1, wherein in the liquid crystal alignment pattern, the direction of the optical axis continuously changes along one direction, the circularly polarizing plate is a combination of a linear polarizer and an $\lambda/4$ plate, the $\lambda/4$ plate has a first phase difference region and a second phase difference region that are divided in the direction in which the direction of the optical axis of the liquid crystal alignment pattern changes and that are elongated in a direction perpendicular to the direction in which the direction of the optical axis of the liquid crystal alignment pattern changes, and directions of slow axes in the first phase difference region and the second phase difference region are perpendicular to each other.

12. The stereoscopic image display device according to claim 11, wherein in the liquid crystal alignment pattern, a distance in which the optical axis rotates by 180° changes in the direction in which the direction of the optical axis of the liquid crystal alignment pattern changes.

13. The stereoscopic image display device according to claim 11, wherein the display panel displays a plurality of different images corresponding to a combination of one first phase difference region and one second phase difference region.

14. The stereoscopic image display device according to claim 1, wherein in a case where refractive index anisotropy of the liquid crystal compound at a wavelength of 550 nm is represented by $\Delta n_{550}$ and a thickness of the optically-anisotropic layer is represented by d, the following Expression (1) is satisfied, $$200 \text{ nm} \leq \Delta n_{550} \times d \leq 350 \text{ nm} \tag{1}$$

15. The stereoscopic image display device according to claim 1,
wherein in a case where refractive index anisotropy of the liquid crystal compound at a wavelength of 450 nm is represented by $\Delta n_{450}$, refractive index anisotropy of the liquid crystal compound at a wavelength of 550 nm is represented by $\Delta n_{550}$, and a thickness of the optically-anisotropic layer is represented by d, the following Expression (2) is satisfied, $$(\Delta n_{450} \times d)/(\Delta n_{550} \times d) \tag{2}$$

16. The stereoscopic image display device according to claim 1,
wherein the circularly polarizing plate is a combination of a linear polarizer and an 214 plate in which an in-plane retardation Re(550) at a wavelength of 550 nm satisfies the following expression, $$100 \text{ nm} \leq Re(550) \leq 180 \text{ nm}.$$

17. The stereoscopic image display device according to claim 16,
wherein in the λ/4 plate, an in-plane retardation Re(450) at a wavelength of 450 nm and an in-plane retardation Re(550) at a wavelength of 550 nm satisfy the following expression, $$Re(450)/Re(550) < 1.$$

18. A wearable display device comprising:
the stereoscopic image display device according to claim 17; and
an eyepiece for collecting an image displayed by the stereoscopic image display device.

19. A wearable display device comprising:
the stereoscopic image display device according to claim 2; and
an eyepiece for collecting an image displayed by the stereoscopic image display device.

* * * * *